(12) United States Patent
De Decker et al.

(10) Patent No.: US 11,051,050 B2
(45) Date of Patent: *Jun. 29, 2021

(54) LIVE STREAMING WITH LIVE VIDEO PRODUCTION AND COMMENTARY

(71) Applicant: Kiswe Mobile Inc., Rockville, MD (US)

(72) Inventors: Bert De Decker, Hasselt (BE); Tom Cuypers, Tongeren (BE); Wim Sweldens, Summit, NJ (US); Francis X. Zane, New Providence, NJ (US); Thomas J. Janiszewski, Andover, NJ (US); Yung-Lung Ho, Bethesda, MD (US)

(73) Assignee: Kiswe Mobile Inc., Rockville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/709,174

(22) Filed: Dec. 10, 2019

(65) Prior Publication Data

US 2020/0120363 A1 Apr. 16, 2020

Related U.S. Application Data

(63) Continuation-in-part of application No. 16/225,335, filed on Dec. 19, 2018, now Pat. No. 10,887,646.
(Continued)

(51) Int. Cl.
*G06F 15/16* (2006.01)
*H04N 21/2187* (2011.01)
(Continued)

(52) U.S. Cl.
CPC ....... *H04N 21/2187* (2013.01); *H04N 21/231* (2013.01); *H04N 21/234* (2013.01);
(Continued)

(58) Field of Classification Search
CPC ............ H04N 21/2187; H04N 21/231; H04N 21/234; H04N 21/44; H04N 21/4788; H04N 21/643
See application file for complete search history.

(56) References Cited

U.S. PATENT DOCUMENTS 9,635,431 B2  4/2017 Zane et al.
9,654,844 B2  5/2017 Kim et al.
(Continued)

FOREIGN PATENT DOCUMENTS

WO  2017096517 A1  6/2017
WO  2018027237 A1  2/2018

*Primary Examiner* — Razu A Miah
(74) *Attorney, Agent, or Firm* — Ryan, Mason & Lewis, LLP

(57) ABSTRACT

A method comprises receiving from each of a plurality of commentator applications corresponding commentary information relating to video content from at least one video source, sending at least portions of the commentary information received from each of the commentator applications to one or more other ones of the commentator applications, and generating commented video content based at least in part on the commentary information received from the commentator applications. The commented video content is provided to one or more servers of a content delivery network for delivery to one or more viewer devices. The receiving and sending are illustratively implemented in a media server through interaction of the media server with web browsers of respective commentator devices that implement the commentator applications. Each of the web browsers may implement an instance of a commentary mixer configured to combine commentary information from its commentator application with additional commentary from other commentator applications.

24 Claims, 6 Drawing Sheets

Related U.S. Application Data

(60) Provisional application No. 62/719,278, filed on Aug. 17, 2018, provisional application No. 62/883,732, filed on Aug. 7, 2019.

(51) Int. Cl.
| | | |
|---|---|---|
| *H04N 21/234* | (2011.01) | |
| *H04N 21/44* | (2011.01) | |
| *H04N 21/231* | (2011.01) | |
| *H04N 21/4788* | (2011.01) | |
| *H04N 21/643* | (2011.01) | |
| *H04N 21/488* | (2011.01) | |

(52) U.S. Cl.
CPC ......... *H04N 21/44* (2013.01); *H04N 21/4788* (2013.01); *H04N 21/4884* (2013.01); *H04N 21/643* (2013.01)

(56) References Cited

U.S. PATENT DOCUMENTS

| | | | |
|---|---|---|---|
| 9,661,355 B2 | 5/2017 | Ho | |
| 9,832,491 B2 | 11/2017 | Ho | |
| 9,900,362 B2 | 2/2018 | Kim et al. | |
| 9,942,343 B2 | 4/2018 | Zane et al. | |
| 10,182,270 B2 | 1/2019 | Kim et al. | |
| 10,419,513 B2 | 9/2019 | Kim et al. | |
| 2004/0226047 A1* | 11/2004 | Lin .................... | H04N 21/4143 725/109 |
| 2007/0279494 A1* | 12/2007 | Aman .................... | G06T 7/269 348/169 |
| 2008/0046352 A1* | 2/2008 | Jung .................. | G06Q 30/0283 705/37 |
| 2008/0201389 A1* | 8/2008 | Cohen ............... | H04L 29/06095 |
| 2008/0304571 A1* | 12/2008 | Tsukagoshi ........ | H04N 21/4307 375/240.25 |
| 2011/0026900 A1* | 2/2011 | Lussier ................. | G06F 3/0481 386/281 |
| 2011/0090897 A1* | 4/2011 | Johnson ............. | H04N 21/2368 370/350 |
| 2011/0202967 A1 | 8/2011 | Hecht et al. | |
| 2011/0238495 A1* | 9/2011 | Kang .................... | G06Q 30/02 705/14.49 |
| 2012/0117584 A1* | 5/2012 | Gordon ................ | H04N 21/278 725/19 |
| 2012/0320013 A1* | 12/2012 | Perez .................. | H04N 21/632 345/207 |
| 2013/0336412 A1* | 12/2013 | Erofeev ............... | G11B 27/031 375/240.28 |
| 2014/0129942 A1* | 5/2014 | Rathod ........... | H04N 21/44222 715/720 |
| 2014/0188997 A1 | 7/2014 | Schneiderman et al. | |
| 2014/0281001 A1* | 9/2014 | Harrison ........... | H04N 21/2343 709/231 |
| 2014/0297815 A1* | 10/2014 | Rajapakse ............. | H04L 65/608 709/219 |
| 2014/0344334 A1* | 11/2014 | Trachtenberg ........ | H04L 65/601 709/203 |
| 2014/0351045 A1* | 11/2014 | Abihssira ........... | G06Q 30/0255 705/14.53 |
| 2015/0092106 A1 | 4/2015 | Savare et al. | |
| 2015/0135234 A1* | 5/2015 | Hall ................... | H04N 21/2343 725/59 |
| 2015/0312354 A1* | 10/2015 | Boyle .............. | H04N 21/23109 709/219 |
| 2015/0341528 A1* | 11/2015 | Ren ....................... | H04L 65/608 348/515 |
| 2016/0173557 A1* | 6/2016 | Lee ...................... | H04L 65/403 709/206 |
| 2016/0295293 A1* | 10/2016 | McLaughlin ...... | H04N 21/4302 |
| 2017/0110152 A1* | 4/2017 | Hundemer ............... | H04N 5/77 |
| 2017/0127126 A1* | 5/2017 | Strein ................ | H04N 21/6125 |
| 2017/0142451 A1 | 5/2017 | Xu et al. | |
| 2017/0214945 A1* | 7/2017 | Chang ................ | H04N 21/4788 |
| 2018/0077467 A1 | 3/2018 | Novobilski | |
| 2018/0316939 A1* | 11/2018 | Todd .................. | H04N 21/6587 |

* cited by examiner

LIVE STREAMING WITH LIVE VIDEO PRODUCTION AND COMMENTARY

RELATED APPLICATIONS

The present application is a continuation-in-part of U.S. patent application Ser. No. 16/225,335, filed Dec. 19, 2018 and entitled "Live Streaming with Multiple Remote Commentators," which claims priority to U.S. Provisional Patent Application Ser. No. 62/719,278, filed Aug. 17, 2018 and entitled "Live Streaming with Multiple Remote Commentators," each incorporated by reference herein in its entirety. The present application also claims priority to U.S. Provisional Patent Application Ser. No. 62/883,732, filed Aug. 7, 2019 and entitled "Live Streaming with Live Video Production and Commentary," which is also incorporated by reference herein in its entirety.

FIELD

The field relates generally to live video and other types of media content, and more particularly to processing of media content.

BACKGROUND

The rapidly growing use of mobile devices such as laptops, tablets and cellphones has greatly diversified the available modes of media consumption. In these and other contexts, a wide variety of different media streaming techniques are known, including techniques for streaming of media over the Internet using hypertext transfer protocol (HTTP). More specific examples of HTTP streaming techniques include the Apple HTTP Live Streaming (HLS) protocol, Microsoft Smooth Streaming (MSS), and MPEG Dynamic Adaptive Streaming over HTTP (DASH). Various non-HTTP streaming techniques are also known, including real-time messaging protocol (RTMP). Despite recent advances in this area, a need remains for improved techniques for streaming of live video and other types of media content.

SUMMARY

Illustrative embodiments of the invention provide content delivery systems with functionality for live video streaming augmented with audio commentary or other types of commentary information from one or more remote commentators. These and other embodiments additionally or alternatively include functionality for live video streaming with live video production.

The growing capacity of the Internet to accommodate streaming media has naturally led to rapid increases in the number of live events that can be viewed online. Both major and niche events can now reach audiences everywhere with Internet connectivity. For example, a live event, such as a sporting event or an e-gaming event, can be watched by many people in different countries or other geographic regions around the world, possibly with different commentary audio provided to different audiences in the local language of their respective countries or other geographic regions.

In conventional practice, such arrangements generally require having multiple commentators fluent in various languages physically present either at the event or in television studios equipped with specialized television studio equipment. The specialized television studio equipment may include, for example, specialized digital video processing hardware used to keep voice from one or more of the commentators and video from the live event synchronized in a broadcast to a given audience.

Unfortunately, these conventional approaches are unduly expensive, in that they require the commentators to travel either to the actual event or to a television studio, and also require the above-noted specialized television studio equipment. Such conventional approaches can be prohibitively expensive for many less affluent markets, and moreover do not readily scale to large numbers of commentators.

Illustrative embodiments disclosed herein solve these and other problems of conventional approaches, for example, by allowing multiple remote registered commentators, equipped with widely-available personal computing devices, such as personal computers, tablets, or smartphones, suitably modified with respective commentary applications, to add commentary over the Internet to existing live streaming video and audio broadcasts.

In some embodiments, video is generated at a live event and there are one or more registered remote commentators in respective different locations remote from the live event each of whom generates audio or other commentary information that is combined with the video of the live event.

A media processor is illustratively configured in accordance with techniques disclosed herein to ensure that the audio or other commentary information from the remote commentators and the video from the live event are correctly synchronized and mixed before the combined content is segmented and distributed to end users. Such end users are also referred to herein as "viewers."

In one embodiment, a method comprises receiving from each of a plurality of commentator applications corresponding commentary information relating to video content from at least one video source, sending at least portions of the commentary information received from each of the commentator applications to one or more other ones of the commentator applications, and generating commented video content based at least in part on the commentary information received from the commentator applications. The commented video content is provided to one or more servers of a content delivery network for delivery to one or more viewer devices, and illustratively represents a commented version of video content that comprises live video from at least one live video source.

The commentary information received from each of the commentator applications illustratively comprises respective distinct streams of media content from respective ones of the commentator applications, with the stream of media content from a corresponding one of the commentator applications comprising at least one of audio content, video content, image content, social media posting content, chat text and closed caption text.

The commentator applications in some embodiments receive respective instances of a relatively low resolution version of the video content from at least one video source. The relatively low resolution version of the video content is illustratively generated in a pre-mixer of said at least one processing device, utilizing a plurality of relatively high resolution content streams from respective ones of a plurality of video sources.

In some embodiments, the receiving and sending are implemented in a media server of said at least one processing device through interaction of the media server with respective web browsers of the respective commentator devices.

Each of the web browsers illustratively implements an instance of a commentary mixer configured to combine commentary information from its corresponding commentator application with additional commentary information received from respective other ones of the commentator applications via the media server.

The instances of the commentary mixers implemented by respective ones of the web browsers in some embodiments are synchronized with one another relative to the video content to less than a specified amount of delay in order to support apparent real-time interaction between users of the commentator applications in the commented video content as viewed at the one or more viewer devices.

Additionally or alternatively, a first web browser of a first one of the commentator devices is illustratively configured to present commentary information received from respective other web browsers of other ones of the commentator devices via the media server. The commentary information received from the respective other web browsers via the media server is presented by the first web browser in respective distinct display windows, or using other browser-based display techniques.

Although web browsers are used in some embodiments, a wide variety of other types of application programs, such as native desktop applications or other computer applications that do not operate as or otherwise include web browsers, can be used in addition to or in place of web browsers to support remote commentary in other embodiments.

In some embodiments, generating the commented video content illustratively comprises generating the commented video content by combining, in a post-mixer of said at least one processing device, at least portions of the commentary information received from the commentator applications with a relatively high resolution version of the video content from said at least one video source.

Illustrative embodiments are advantageously configured to readily accommodate large numbers of remote commentators, such as remote commentators that are located in close enough proximity to one another so as to have sufficiently low voice communication delay between them. For example, multiple groups of such remote commentators can be present in respective different countries or other geographic regions with each such group providing audio commentary for the content delivered to that country or other geographic region. Numerous other arrangements are possible in other embodiments.

DETAILED DESCRIPTION

Embodiments of the invention will be illustrated herein in conjunction with exemplary content delivery systems that include particular arrangements of networks, devices and other components. It should be understood, however, that embodiments of the invention are more generally applicable to a wide variety of other types of content delivery systems and associated networks, devices or techniques. The term "content" as used herein is intended to be broadly construed so as to encompass, for example, live video or other types of multimedia streams as well as other types of content that are deliverable to devices over one or more networks in a content delivery system.

Illustrative embodiments include but are not limited to methods, apparatus, systems, processing devices, integrated circuits, and computer-readable storage media having computer program code embodied therein.

Some embodiments are configured to utilize streaming techniques that are based at least in part on the above-noted Apple HLS protocol. However, it is to be appreciated that other embodiments can be configured utilizing a wide variety of other types of streaming protocols and accordingly are not limited to use with live streaming or HTTP. Accordingly, illustrative embodiments can utilize other HTTP streaming techniques such as MSS and MPEG DASH, in addition to or in place of Apple HLS. Non-HTTP streaming techniques such as RTMP can also be used.

Additionally or alternatively, some embodiments are configured to utilize techniques disclosed in one or more of U.S. Pat. No. 9,635,431, entitled "Live Event Viewing via Mixed Live and On-Demand Streaming," U.S. Pat. Nos. 10,182,270 and 9,654,844, both entitled "Methods and Apparatus for Content Interaction," U.S. Pat. Nos. 9,661,355 and 9,832,491, both entitled "Virtual Immersion Via Streamed Content Adaptation," U.S. Pat. Nos. 10,419,513 and 9,900,362, both entitled "Methods and Apparatus for Reducing Latency Shift in Switching Between Distinct Content Streams," and U.S. Pat. No. 9,942,343, entitled "Efficient Content Streaming Utilizing Local Proxy Server Implemented on Client Device," each of which is incorporated by reference herein in its entirety. It is to be appreciated, however, that utilization of such techniques is not a requirement in any particular illustrative embodiment.

Figure 1:
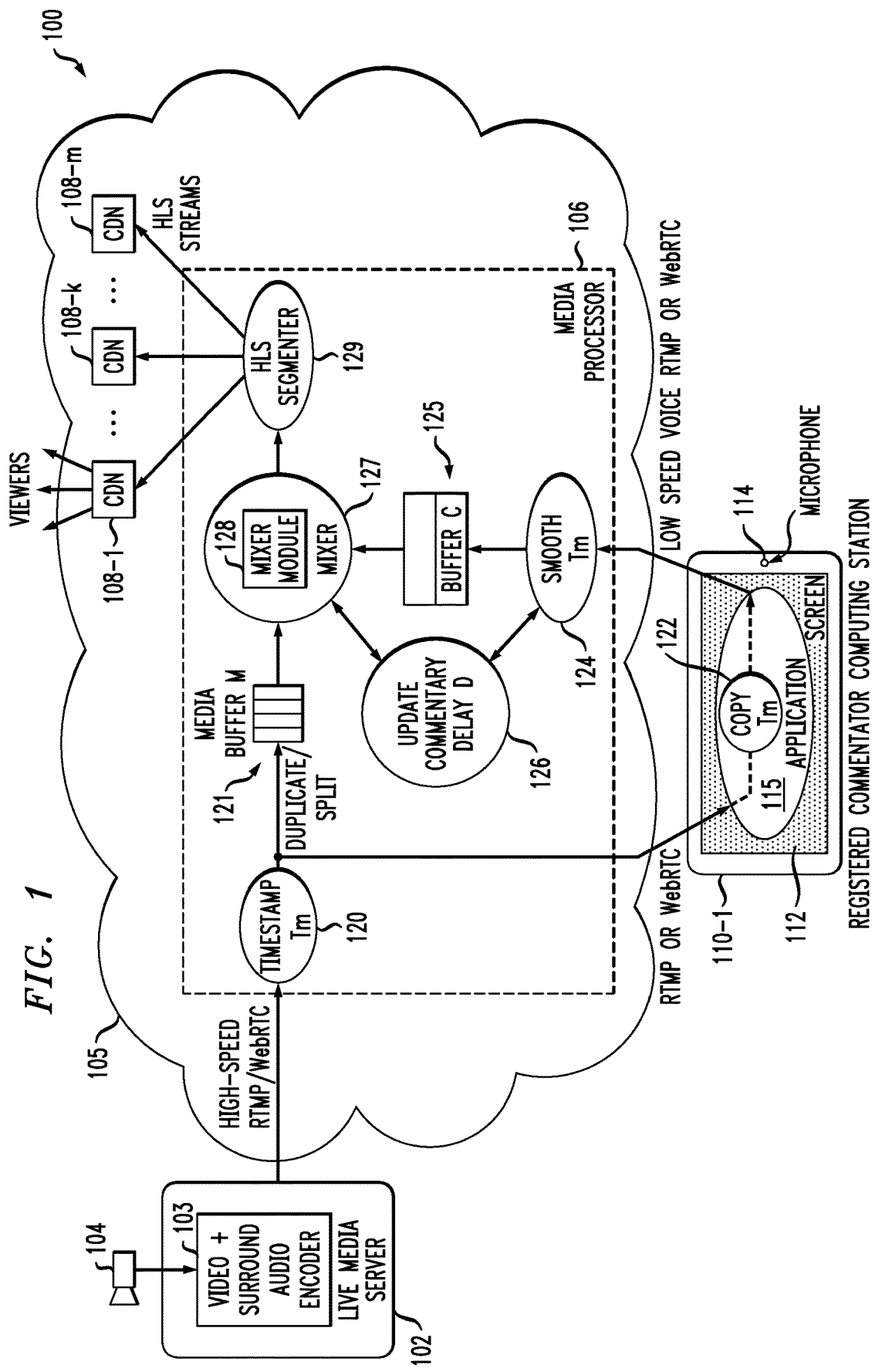
FIG. 1 is a block diagram of an exemplary content delivery system with a cloud-based remote commentator configuration in an illustrative embodiment.

FIG. 1 shows a content delivery system 100 that implements functionality for one or more remote commentators, although a commentator station of only a single remote commentator is explicitly shown in the figure. In this embodiment, the content delivery system 100 illustratively comprises a live media server 102 that comprises a video and surround audio encoder 103. The live media server 102 receives live video from a video camera 104 that is assumed to be arranged to capture video of a live event.

The live media server 102 is coupled to a network 105 that includes a media processor 106 and a plurality of content delivery network (CDN) web servers 108-1, ... 108-k, ... 108-m. The media processor 106 provides HLS streams including media segments and associated playlists to the CDN web servers 108. The CDN web servers 108 deliver content streams to respective client devices of respective viewers responsive to requests received from those client devices. Each such client device implements a media player for requesting and playing content for its corresponding viewer. The client devices of the respective viewers are not explicitly shown in the figure, but can include various types of mobile devices.

The playlists of the HLS streams may be illustratively implemented as respective "index files," although other types of playlists can be used in other embodiments. Such an index file or other type of playlist in some embodiments illustratively provides an ordered list of the Uniform Resource Locators (URLs) of the corresponding media segments. Other types of media segment identifiers can be used in other embodiments.

Also coupled to the network 105 is a registered commentator computing station 110-1, illustratively implemented as a cellphone, also referred to as a mobile telephone or a "smartphone," having a screen 112 and a microphone 114. The registered commentator computing station 110-1, which is also referred to herein as simply a "commentator station," may be viewed as an example of what is more generally referred to herein as a "registered commentator device." A wide variety of other types of registered commentator devices can be used, including various other types of mobile devices, client devices or other types of personal computing devices, such as personal computers or tablets.

The commentator station 110-1 implements a commentator application 115 that is configured to interact with the media processor 106 over the network 105 in providing remote commentary for live video. More detailed examples of such interaction will be described below in conjunction with the flow diagrams of FIGS. 2 and 4. The commentator application 115 is illustratively implemented at least in part as one or more software programs stored in a memory of the commentator station 110-1 and executed by a processor of the commentator station 110-1. The one or more software programs when executed provide functionality for delivering remote commentary from the commentator station 110-1 back to the media processor 106, at least in part responsive to video received from the media processor 106 and displayed on the screen 112 of the commentator station 110-1.

The remote commentator associated with the commentator station 110-1 provides audio input to the commentator application 115 via the microphone 114. Other types of input can be provided using other user input mechanisms. For example, touch input can be provided via the screen 112. Other user input mechanisms, such as a mouse or keyboard, can be used in addition to or in place of the touch-screen input mechanism. It is also possible that user input can be provided to the computing station via spoken commands or gestures, which are recognized by respective speech recognition or gesture recognition functionality implemented in the commentator station 110-1. Various combinations of these and other user input mechanisms can be used in a given embodiment.

A user of the commentator station 110-1 is also referred to herein in the context of some embodiments as a "registered commentator." Various authentication mechanisms can be used in illustrative embodiments in order to ensure that only commentators presenting the appropriate credentials can access the commentator application 115 on the commentator station 110-1.

The commentator application 115 in this embodiment is assumed to comprise a video streaming application, suitably adapted to support the remote commentator functionality disclosed herein. Other modules providing other functionality can also be implemented within the application. Moreover, the commentator station 110-1 can incorporate multiple applications, although only a single application is shown in the present embodiment. In some implementations, the commentator application 115 can comprise portions of multiple applications. Accordingly, the term "application" as used herein is intended to be broadly construed. Such an application is also referred to herein as an "application program" although it is to be appreciated that an application program can itself comprise multiple distinct software programs.

The commentator station 110-1 is just one example of a client device. It is to be appreciated that a wide variety of different media players or other client devices can be used, and such media players or other client devices need not be implemented using a built-in HLS client arrangement. For example, other types of built-in clients can be used. Thus, a "client device" as that term is broadly used herein should not be construed as being limited, for example, to a hardware-assisted media player that utilizes a client built into the media player operating system. Accordingly, in other embodiments, a client device can include an internal media player. The built-in HLS client can itself be considered a type of media player.

The CDN web servers 108 in the FIG. 1 embodiment are examples of what are also referred to as distributed HTTP based web servers or simply as distributed web servers. Such servers can be configured to deliver a wide variety of media content other than live video. The CDN web servers in some embodiments comprise a collection of distributed web servers that are set up in a cloud or other type of network such as network 105 in order to distribute live video or other types of media content. Numerous other arrangements of distributed web servers can be used in other embodiments.

The media processor 106 may comprise one or more video servers, and may also be referred to as a content provider server.

The network 105 over which the live media server 102, the commentator station 110-1, the media processor 106 and the CDN web servers 108 communicate is assumed to support HTTP communications. It should be noted that, although HTTP communications are used in the present embodiment, other embodiments can utilize other types of protocols for media streaming over the Internet, or more generally any of a wide variety of other techniques for media content delivery. At least a portion of the CDN web servers 108 may be part of a cloud arrangement.

Each of the CDN web servers 108 is configured for media streaming. Each such web server illustratively caches video segments and associated index files received from the media processor 106 over the network 105.

The content delivery system 100 can include multiple instances of components such as live media server 102, video camera 104 and media processor 106, although only single instances of such components are shown in the figure for clarity and simplicity of illustration.

Media segments and associated index files are supplied by the media processor 106 to at least a subset of the CDN web servers 108 over the network 105 via one or more connections. The encoding of video in illustrative embodiments can utilize known encoding techniques such as H.264. Also, the segmenting of the encoded video can be performed in accordance with known streaming protocols such as Apple HLS, MSS or MPEG DASH.

It is to be appreciated, however, that a wide variety of different encoding and segmenting techniques can be used in other embodiments, including, by way of example only, those techniques described in the above-cited U.S. Pat. Nos. 10,419,513 and 9,900,362.

Each of the CDN web servers 108 illustratively stores multiple index files as well as sets of video segments associated with respective ones of those index files. As noted above, index files are considered examples of what are more generally referred to herein as "playlists." The video segments are considered an example of what is more generally referred to herein as "media segments." A wide variety of different arrangements of index files or other types of playlists, and associated video segments or other types of media segments, can be used in different embodiments.

For example, in some embodiments, live video can be streamed within the content delivery system 100 utilizing HTTP streaming technology such as the above-noted HLS, MSS or MPEG DASH protocols. With HTTP streaming, video associated with a given content stream is segmented by the media processor 106. As soon as a given video segment is ready, it is delivered to the CDN web servers 108 so as to be available for mass distribution to client devices of respective viewers within the system 100. At session initiation, a media player obtains an initial master playlist indicating the available content streams and their associated web addresses (e.g., URLs). Depending on the streaming technology, locating the available content streams may be an indirect process where the master playlist points to index files that can be polled to indicate the URL and availability of the next segment.

Media streaming using HTTP based protocols has become ubiquitous due to its flexibility, compatibility with generic web servers such as CDN web servers 108 for content distribution, and ability to traverse common firewalls. HTTP streaming standards such as Apple HLS generally work by breaking the content stream into small HTTP-based file segments, which are distributed to the CDN web servers 108 and downloaded by request by a media player client via each segment's uniquely assigned web address (e.g., URL).

In some embodiments, HLS streaming relies on playlists that contain the URLs of the available media segments. These playlists reside in the same CDN web servers 108 with the media segments to be streamed. At session initiation, the media processor 106 downloads a master playlist containing the URLs of the various alternative playlists available for the desired content. Mostly, the optional playlists allow the player to optimize playback based on screen resolution and bandwidth availability. Once given the playlist URLs, a built-in HLS client can autonomously download the referenced playlist, request media segments, then reconstruct and play the requested video stream.

In addition to the above-noted bandwidth options, HLS supports different content specific playlists, including live playlists, event playlists, and video-on-demand (VoD) playlists, as described in Apple Technical Note TN2288, which is incorporated by reference herein. The VoD playlist, which is used for playback of prerecorded media, contains references to all the media segments for the video. The client needs to download the list only once at the start of a session. On the other hand, both live and event types of broadcast require continuous updates to their respective playlists as new video segments are created and uploaded to the CDN web servers. As such, the client must also repeatedly download the referenced playlist to get the latest media segment URL.

The operation of the media processor 106 and its interaction with commentator application 115 of the commentator station 110-1 to support remote commentator functionality will now be described in more detail.

In one possible operating scenario, the media processor 106 receives video content from the live media server 102.

The video content includes video of a live event as captured by the video camera 104 and may additionally include associated surround audio from multiple microphones deployed at the live event. The video content is delivered from the live media server 102 to the media processor 106 via the network 105, illustratively using a high-speed connection based on a protocol such as RTMP or web real-time communications (WebRTC).

The media processor 106 includes a timestamp module 120 that generates timestamps for respective frames of the video content. A given such timestamp is denoted Tm in the figure, and is an example of what is also referred to herein as a "first timestamp." The timestamp module 120 timestamps incoming frames of the video content to generate respective first timestamps.

The timestamped video content is duplicated or otherwise split as shown, to produce two identical streams, with a first one of the streams being applied to a media buffer 121 of the media processor 106, and a second one of the streams being delivered to the commentator application 115 of the commentator station 110-1 over the network 105. The second stream is illustratively delivered to the commentator station 110-1 again using a protocol such as RTMP or WebRTC, but possibly at a slower speed than that used by the high-speed connection between live media server 102 and media processor 106.

A timestamp module 122 in the commentator application 115 is configured to associate frames of audio content comprising audio input received from the remote commentator via microphone 114 with respective timestamps copied from the timestamped frames of the video content received from the media processor 106. The copied timestamps are examples of what are more generally referred to herein as "second timestamps" that are associated with respective frames of audio content in the commentator application 115. A given such second timestamp more particularly comprises a copy of a corresponding one of the first timestamps, with the copy being generated by the timestamp module 122 of the commentator application 115. The resulting copied timestamp can then be inserted into the appropriate frame of the audio content by the commentator application 115.

The timestamped audio content is provided by the commentator application 115 back to the media processor 106 over network 105, illustratively using a low-speed voice connection but again implemented using a protocol such as RTMP or WebRTC.

The media processor 106 receives the frames of the audio content from the commentator application 115 in association with respective second timestamps. For example, the media processor 106 illustratively receives from the commentator application 115 a plurality of audio frames having inserted therein respective ones of the second timestamps that are copies of corresponding ones of the first timestamps. The media processor 106 combines the frames of the video content with the received audio content based at least in part on the first timestamps and the second timestamps to generate commented video content that is provided to the CDN web servers 108 for delivery to client devices of respective viewers. Such client devices are also referred to herein as "viewer devices."

This is an example of an arrangement in which the frames of the video content are provided by the media processor 106 in association with the first timestamps to the commentator application 115 of the commentator station 110-1 at a first relatively low video quality level and the commented video content is provided by the media processor 106 to the CDN web servers 108 at a second relatively high video quality level.

The term "commented video content" as used herein is intended to be broadly construed, so as to encompass, for example, a final output video stream, also referred to herein as an "end result" output video stream, or another type of output video stream or other video stream that incorporates commentary from one or more remote commentators.

The combining of the frames of the video content with the audio content received from the commentator station 110-1 illustratively proceeds in the following manner in the media processor 106. As mentioned previously, the frames of the video content are stored in the media buffer 121 of the media processor 106. The media buffer 121, also denoted as media buffer M herein, is an example of what is more generally referred to herein as a "video frame buffer."

The frames of the received audio content are processed through a timestamp smoothing module 124 and then stored in an audio frame buffer 125, also denoted as commentary buffer C herein. For example, in some embodiments the timestamp smoothing module 124 extracts respective ones of the second timestamps from respective frames of the received audio content and applies a smoothing algorithm to the extracted second timestamps, such that the smoothed second timestamps can be utilized by the media processor 106 in combining the frames of the video content with the received audio content. Other types of timestamp smoothing arrangements can be used in other embodiments.

The media processor 106 further comprises a delay update module 126, configured to control an updated commentary delay of the received audio content. For example, in some embodiments, a current commentary delay D is determined by the delay update module 126 as a function of a measured delay of a frame of the audio content and a jitter accommodation component for the commentator application 115. The measured delay of the frame of the audio content in such an arrangement is illustratively determined as a function of a corresponding one of the second timestamps, after smoothing, and the processor clock time. The jitter accommodation component for the commentator application 115 is illustratively determined by processing a plurality of the second timestamps, prior to smoothing. Numerous alternative delay update arrangements can be used.

The video frames from the media buffer 121 are combined with the audio frames from the audio frame buffer 125 by a mixer 127 that includes an internal media mixer module 128. This combination process illustratively utilizes an updated commentary delay provided to the mixer 127 by the delay update module 126. The resulting commented video content is segmented in an HLS segmenter 129 and delivered from the media processor 106 to each of the CDN web servers 108 over the network 105 as shown.

In combining the frames of the video content with the received audio content based at least in part on the first timestamps and the second timestamps to generate commented video content, the mixer 127 illustratively compares a current commentary delay to a designated delay, and responsive to a difference between the current commentary delay and the designated delay being above a specified threshold, resetting the designated delay to the current commentary delay. The mixer 127 is further configured to determine a start time of a current output frame of the commented video content as a function of a processor clock time and the designated delay, and to initiate output of the current output frame of the commented video content in accordance with the determined start time.

The media processor 106 can be further configured to perform additional operations in conjunction with combining the frames of the video content with the received audio content based at least in part on the first timestamps and the second timestamps to generate commented video content. For example, the media processor 106 can delete from each of one or more of the media buffer 121 and the audio frame buffer 125 one or more frames having timestamps earlier than a current output frame start time. As another example, the media processor 106 can, responsive to detection of an empty video or audio frame buffer, or a video or audio frame having a timestamp greater than a sum of the current output frame time and a frame duration, insert a video or audio loss concealment frame. Additionally or alternatively, responsive to a measured delay of an audio frame of the audio content exceeding a specified threshold, the media processor 106 can signal the commentator application 115 to restart its playback of the video content.

In the FIG. 1 embodiment, the frames of video content are generated by live media server 102 and its video and surround audio encoder 103 which processes live video from video camera 104 at a live event. The live media server 102 is illustratively located at the venue of the live event, but other arrangements are possible. There is at least one registered remote commentator associated with the commentator station 110-1 in a location remote from the live event. The remote commentator generates audio commentary regarding the live event as he or she views the corresponding live video on the commentator station 110-1. The media processor 106 ensures that the audio and video is correctly synchronized and mixed before it is segmented and distributed to the CDN web servers 108 for delivery to end users.

It should be noted that the live video supplied by the live media server 102 to the media processor 106 also illustratively comprises audio, such as audio encoded with the video utilizing the video and surround audio encoder 103. Such surround audio should be understood to be distinct from commentary audio supplied by a remote commentator and mixed with the live audio in the media processor 106.

As will become more apparent from the embodiments of FIGS. 3 and 4 to be described below, the FIG. 1 embodiment can be extended to accommodate multiple remote commentators, assuming by way of example that such remote commentators are located in close enough proximity to one another so as to have sufficiently low voice communication delay between them. For example, multiple commentators speaking a particular language can all be located within the same country or geographic region. The content delivery system 100 can therefore generate multiple distinct commented video content streams, each with commentary from one or more remote commentators in a particular language, for delivery to respective distinct audiences in different countries or other geographic regions. Accordingly, multiple groups of remote commentators can be present in respective different countries or other geographic regions with each such group providing audio commentary in the appropriate language for the content delivered to that country or other geographic region.

Illustrative embodiments allow the remote commentators to work from any location with Internet access even if not enough bandwidth is available to receive the highest original quality video of the event. The end user video quality is independent of the quality of the commentator's downstream video. Moreover, as asymmetrical connections are still the norm for home Internet links, the system requires commentators to have sufficient bandwidth to downstream video at some minimal level of quality, but only up-streams lower bandwidth voice.

Although the remote commentator in some embodiments is at a location remote from the live event venue, it is possible in other embodiments for one or more commentators to be present at the live event venue and adding their commentary to the live video from that site, albeit using a registered commentator computing station and its associated functionality as illustrated in FIG. 1 instead of conventional specialized television studio equipment.

Many different protocols can be used for streaming audio and video in illustrative embodiments. These include the above-noted HLS, MSS, MPEG DASH, RTMP and WebRTC protocols, as well as other protocols such as real-time transport protocol (RTP). Illustrative embodiments are independent of the particular video streaming protocol used in any part of the system. That said, a typical embodiment such as that shown in FIG. 1 is illustratively configured to utilize real-time protocols such as RTMP and WebRTC between the live media server 102, the media processor 106, the commentator stations such as commentator station 110-1, and the distributor. The "distributor" as that term is broadly used herein is intended to encompass, for example, a content distribution entity providing at least a subset of the CDN web servers 108. The distributor would typically deliver the content using protocols such as HLS, MSS or MPEG DASH that scale well for a large number of viewers using CDN technology.

In the FIG. 1 embodiment, the content delivery system 100 in its media processor 106 combines video from a live source with audio-only commentary from a remote commentator. The live media server illustratively compresses the video streamed from a live source, e.g., a live event or an electronic video gaming system. The resulting encoded video streams are sent to the media processor 106.

The media processor 106 is shown in FIG. 1 as being implemented in the network 105 but could in other embodiments be co-located with the live media server 102 adjacent the network edge. Alternative cloud-based implementations of the media processor 106 are also possible. In addition, as mentioned previously, there may be multiple instances of the media processor 106 distributed at distinct locations within the system 100. The media processor 106 in illustrative embodiments is configured to synchronize audio from the remote commentator with the live event video and to forward the mixed stream to the distributor.

To maximize quality for every viewer, the live video uplink from the live media server 102 to the media processor 106 should have sufficient bandwidth to support high-resolution video streams with high reliability, minimum delay, and low jitter. An important aspect of some embodiments is that the distributor has access to the highest quality video from the original event irrespective of the Internet bandwidth available to the remote commentator. For example, illustrative embodiments allow for a scenario where end users have higher Internet bandwidth than the remote commentator and will receive better video quality of the original event than that received by the remote commentator.

Notably, with current streaming protocols, media servers commonly stream multiple versions of the same content, each encoded to different levels of quality of service (QoS). The viewing device of an end user negotiates with one or more of the CDN web servers 108 to obtain the best quality video that its network connection can support. This aspect of the system can be considered standard practice and is therefore not illustrated in FIG. 1.

At the time of ingestion by the media processor 106, each frame of the incoming media stream is timestamped with a corresponding timestamp Tm, by the timestamping module 120 of the media processor 106. The timestamped stream is then duplicated with a copy sent to the commentator station 110-1. Similar to other viewers, the commentator station 110-1 receives a stream quality that depends on the supportable bandwidth of the video downlink from the media processor 106 to the commentator station 110-1. Simultaneously, the video frames are sent to the media buffer 121, where they are queued until the matching commentator's audio stream is received and ready for mixing.

The commentator application 115 installed in the commentator station 110-1 allows the commentator to sign on, view, and comment on the event. This can for example be implemented inside a standard browser or as a stand-alone software implementation. The commentator application 115 will play the video from the original event to the commentator, usually via built-in media players in the browsers or mobile devices, and at the same time record the commentator's audio.

An important aspect of some embodiments is that the commentator application 115 will copy the timestamps Tm of the original event video as extracted by the commentator's video player and insert them into the audio frames being sent back to the media processor 106. This marks the audio stream with the appropriate timing information from the video frame, effectively linking what was said with what was seen on-screen by the commentator at that moment, for later synchronization. The video from the original event, however, will not be sent back from the commentator to the media processor. Thus, the voice uplink from the commentator station to the media processor can have substantially lower bandwidth as it is only being used to send back the commentator's audio stream.

The media processor 106 ingests the commentator voice stream and reads the timestamps Tm from the audio stream before queuing the audio frames in the audio frame buffer 125, which as previously noted is also referred to herein as commentary buffer C. This stream of timestamps Tm, while providing a measure of audio delay, in some cases includes jitter introduced by a lower quality commentator video downlink as well as the queuing scheme deployed by the commentator's built-in video player. Therefore, the media processor 106 is configured to apply a smoothing algorithm in the timestamp smoothing module 124 to the timestamps Tm and then to re-timestamp the audio stream. For example, a standard exponential smoothing algorithm is applied in some embodiments. Other smoothing techniques, such as averaging over a sliding window time period, may also be used. The time constant or window size for smoothing is a parameter that can be configured via link quality testing during initialization of the commentator's custom application.

Each of the buffers 121 and 125 is assumed to be sized dynamically and can grow to accommodate ingested data up to preset maximums. In practice, to minimize latency, the mixer 127 extracts a frame for mixing shortly after an audio frame and its matching video, appropriately delayed by the mixer algorithm, are queued. A standard software-based media mixer module 128 within the mixer 127 can be used to insert the commentary into the media stream. Finally, the commented media frames are queued and segmented by a standard HLS segmenter 129 for distribution to the CDN web servers 108.

Figure 2:
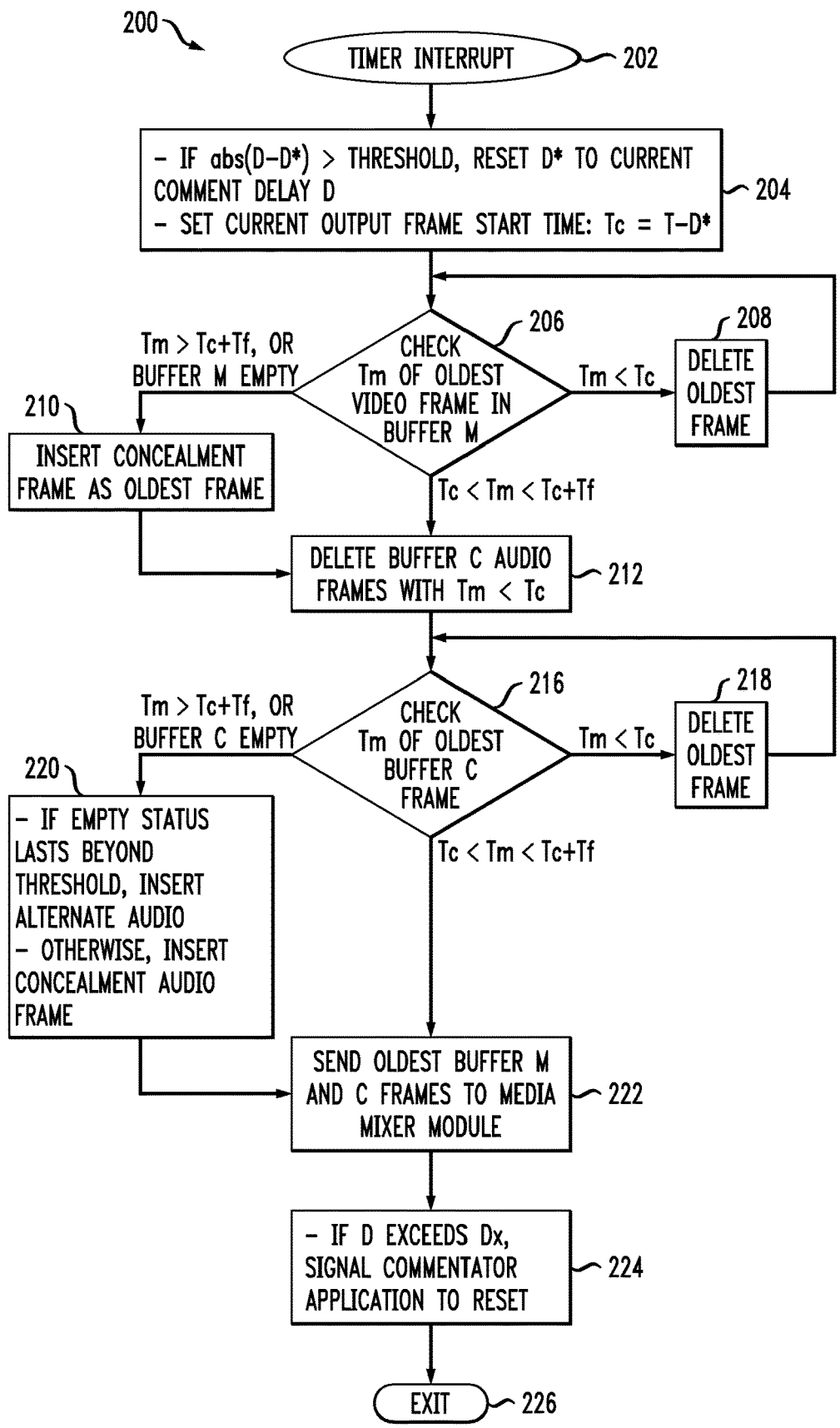
FIG. 2 is a flow diagram of a mixer algorithm in an illustrative embodiment.

FIG. 2 shows an example of a mixer algorithm 200 implemented at least in part by the mixer 127 in the media processor 106 in content delivery system 100 of FIG. 1. It is assumed that the mixer algorithm 200 is timer driven to generate video synchronously at a standard frame rate clock interval, e.g., 29.97 Hz.

The mixer algorithm 200 illustratively comprises repeated iterations of steps 202 through 226. Although these steps are performed primarily by mixer 127, other modules such as modules 124 and 126, or more generally other portions of the media processor 106, can perform at least portions of one or more of the steps.

In step 202, a given iteration of the mixer algorithm 200 is triggered via a timer interrupt as shown.

In step 204, the current frame output time range is updated. The current frame output time range is bounded by frame starting time Tc and Tc+Tf, where Tf is the duration of a video frame. As shown, Tc is set as T−D*, where T is the clock time of the media processor 106. Essentially, the setting of Tc instructs the mixer 127 to delay the video frame output by a delay D*. D* is periodically reset to the measured current commentary delay D, when the difference between D and D* exceeds a preset threshold.

More specifically, D=Td+Tj where Td is the measured current audio delay and Tj is the extra delay added to accommodate potential jitter from the commentator's voice uplink. At each audio frame's ingestion, Td is calculated as T−Tm(smoothed). As the overall system is asynchronous, the measured current commentary delay D is likely to drift over time, necessitating the reset of D*. The reset threshold, however, is configured to minimize frequent resets to minimize interruption of the operation of the media mixer module 128.

Using real-time uplink protocols, Tj should be small and can be determined via link quality tests during system initialization. However, the present embodiment allows for Tj to be derived from the Tm data before smoothing and applied as a dynamic variable.

The mixer 127 then selects the appropriate input video and audio frames to mix from media buffer M and commentary buffer C, respectively, also denoted as respective buffers 121 and 125 in FIG. 1. This portion of the process is carried out using steps 206 through 222.

In step 206, the mixer 127 checks the timestamp Tm of the oldest video frame in media buffer M and proceeds as follows.

If Tm<Tc, the oldest video frame is deleted in step 208 and then step 206 is repeated. This part of the process therefore removes from media buffer M any video frames that are too old, i.e., video frames for which Tm<Tc.

If Tm>Tc+Tf, or media buffer M is empty, the process moves to step 210 to insert a loss concealment video frame as the oldest video frame, and then moves to step 212. This part of the process inserts loss concealment video frames if queued video frames are out of range or media buffer M is empty. Examples of loss concealment video frames include the latest complete video frame or an image still.

If Tc<Tm<Tc+Tf, the oldest video frame is in-range and the process moves directly from step 206 to step 212 as shown.

In step 212, any audio frames with Tm<Tc are deleted from commentary buffer C.

At this point, a particular video frame has been identified for mixing, and it remains to identify in step 216, 218 and 220 an appropriate corresponding audio frame to be mixed with the particular video frame.

In step 216, the mixer 127 checks the timestamp Tm of the oldest audio frame in commentary buffer C and proceeds as follows.

If Tm<Tc, the oldest audio frame is deleted in step 218 and then step 216 is repeated. This part of the process therefore removes from commentary buffer C any audio frames that are too old, i.e., audio frames for which Tm<Tc.

If Tm>Tc+Tf, or commentary buffer C is empty, the process moves to step 220 to insert alternate audio if the empty status has lasted beyond a specified threshold, and otherwise to insert a loss concealment audio frame, and then moves to step 222. This part of the process inserts alternate audio or loss concealment audio frames if queued audio frames are out of range or commentary buffer C is empty. The alternate audio is used in place of loss concealment audio frames when there are too many consecutive missing audio frames to effectively conceal, based upon the above-noted threshold. The alternate audio illustratively comprises a sequence of multiple audio frames, such as an alternate default commentary, prerecorded background music, advertising, general announcements or combinations thereof. Examples of loss concealment audio frames include low-level white noise or repeated audio.

If Tc<Tm<Tc+Tf, the oldest audio frame is in-range and the process moves directly from step 216 to step 222 as shown.

In step 222, the particular identified video frame and the appropriate corresponding audio frame, which illustratively represent the oldest video frame from media buffer M and the oldest audio frame from commentary buffer C, are sent to the media mixer module 128 to be mixed together to create an output commented video frame.

In step 224, a determination is made as to whether or not the measured current commentary delay D exceeds a maximum delay tolerance Dx. If D>Dx, the media processor 106 signals the commentator station 110-1 to restart its video player in order to allow the system to resynchronize, and otherwise does not so signal the commentator station 110-1.

In step 226, the current iteration of the mixer algorithm 200 is exited. Another iteration will be triggered at the next timer interrupt, which restarts the process as described above for mixing of the next selected video and audio frames.

It is to be appreciated that the particular process steps of the FIG. 2 flow diagram and other flow diagrams herein are presented by way of illustrative example only, and should not be construed as limiting in any way. Additional or alternative process steps may be used, and the ordering of the steps may be varied, in other embodiments. Also, steps shown as being performed serially in illustrative embodiments can be performed at least in part in parallel with one another in other embodiments.

As noted above, some embodiments are configured to support multiple remote commentators. For example, two or more commentators at different locations can jointly comment on the same game or other live event for the same audience. As long as the voice communication delay between the commentators is within tolerance, illustrative embodiments readily accommodate multiple commentators.

In multiple commentator embodiments of this type, a plurality of distinct streams of audio content are illustratively received from respective distinct commentator applications on respective distinct commentator stations, and the frames of the video content are combined with the plurality of distinct streams of audio content in a media processor in order to generate the commented video content.

Figure 3:
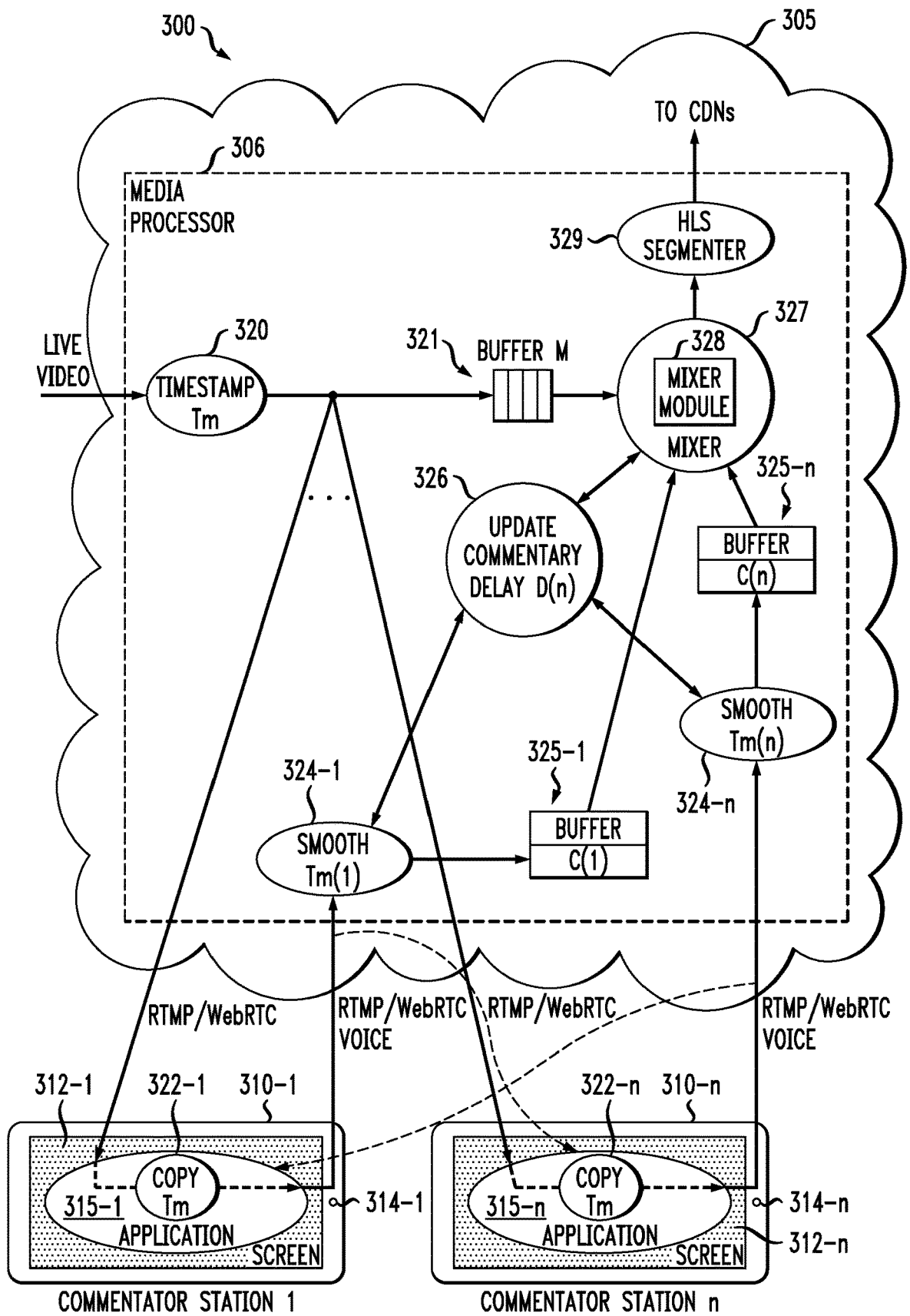
FIG. 3 is a block diagram of a content delivery system with multiple remote commentators in an illustrative embodiment.

FIG. 3 shows one example of an illustrative embodiment of this type. More particularly, FIG. 3 shows a content delivery system 300 that comprises a network 305, a media processor 306 and a plurality of commentator stations 310-1, . . . 310-n. It is assumed that the system 300 further comprises additional components, such as live media server 102, video camera 104 and CDN web servers 108 previously described in conjunction with the FIG. 1 embodiment. The media processor 306 generally operates in a manner similar to that previously described for media processor 106 but its functionality is expanded to accommodate multiple remote commentators rather than a single remote commentator as in the FIG. 1 embodiment. In addition, a given one of the commentator stations 310-1, . . . 310-n generally operates in a manner similar to that previously described for commentator station 110-1.

The commentator stations 310-1, . . . 310-n as illustrated in FIG. 3 comprise respective screens 312-1, . . . 312-n, microphones 314-1, . . . 314-n, commentator applications 315-1, . . . 315-n, and timestamp modules 322-1, . . . 322-n, which correspond to respective components 112, 114, 115 and 122 of commentator station 110-1.

In the FIG. 3 embodiment, the timestamp modules 322-1, . . . 322-n of the respective commentator applications 315-1, . . . 315-n of the respective commentator stations 310-1, . . . 310-n copy the timestamps Tm from the received frames of the incoming live video streams delivered by the media processor 306 to their respective audio commentary streams prior to delivering those audio commentary streams back to the media processor 306. The media processor 306 comprises a timestamp module 320 and a media buffer 321, the latter also denoted as media buffer M, which correspond to respective components 120 and 121 of media processor 106.

The media processor 306 separately smooths and queues the different audio commentary streams received from the respective commentator applications 315-1, . . . 315-n, utilizing respective timestamp smoothing modules 324-1, . . . 324-n and respective audio frame buffers 325-1, . . . 325-n. The audio frame buffers 325-1, . . . 325-n are also denoted herein as commentary buffers C(1) through C(n).

The media processor 306 comprises a delay update module 326, configured to control updated commentary delays for the received audio content from respective ones of the commentator stations 310. For example, for the received audio content from commentator station 310-n, the delay update module 326 utilizes the smoothed timestamp Tm(n) from timestamp smoothing module 324-n to set link delay D(n) as D(n)=Td(n)+Tj(n) where Td(n) and Tj(n) are the respective audio delay and jitter tolerance for voice uplink n from commentator station 310-n to the media processor 306. A similar delay update process is performed in delay update module 326 for the received audio content from each of the other commentator stations 310. Although shown as a single module in this embodiment, the delay update module 326 in other embodiments can be implemented as multiple separate modules, one for each of the commentator stations from which audio commentary is received.

The media processor 306 further comprises mixer 327 which includes a media mixer module 328. The mixer 327 is coupled to an HLS segmenter 329. These components 327, 328 and 329 correspond generally to components 127, 128 and 129 of the FIG. 1 embodiment. However, the mixer 327 of the media processor 306 is configured to synchronize and mix the video frames of the live video content with the audio commentary frames received from the multiple commentator stations 310. In this embodiment, the video frames are delayed by an amount sufficient to accommodate the remote commentator with the longest delay that is within the maximum delay tolerance Dx.

Figure 4:
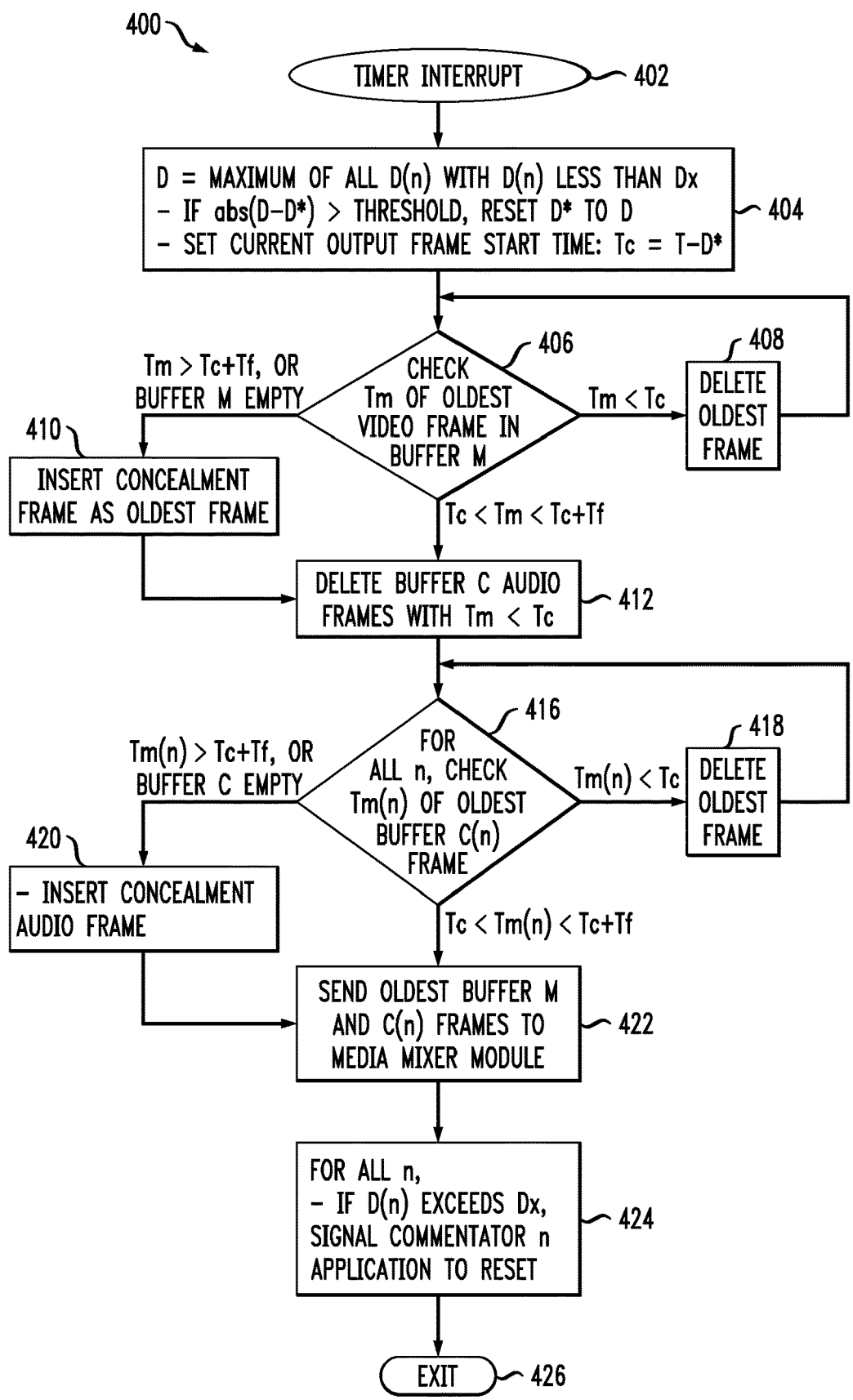
FIG. 4 is a flow diagram of a mixer algorithm for multiple remote commentators in an illustrative embodiment.

FIG. 4 shows an example of a mixer algorithm 400 implemented at least in part by the mixer 327 in the media processor 306 in content delivery system 300 of FIG. 3. It is again assumed that the mixer algorithm 400 is timer driven to generate video synchronously at a standard frame rate clock interval, e.g., 29.97 Hz.

The mixer algorithm 400 illustratively comprises repeated iterations of steps 402 through 426. Although these steps are performed primarily by mixer 327, other modules such as modules 324 and 326, or more generally other portions of the media processor 306, can perform at least portions of one or more of the steps.

The steps 402 through 426 of the mixer algorithm 400 correspond generally to respective corresponding steps 202 through 226 of the mixer algorithm 200 as previously described, but suitably modified to accommodate the multiple commentator stations 310-1, . . . 310-n. References below to "for all n" should be understood to refer to all index values from 1 to n, which correspond to respective ones of the n remote commentators. Similarly, certain references to delays D(n), timestamps Tm(n), and commentary buffers C(n) in the figure, as well as references to other related parameters in the following description, should be understood from the context to span over all of the index values from 1 to n. Accordingly, in some contexts herein the variable n should be viewed as an index, encompassing all integer values from 1 to n, and in other contexts it refers only to the particular index value n. The meaning in the various contexts will be readily apparent to those skilled in the art.

In step 402, a given iteration of the mixer algorithm 400 is triggered via a timer interrupt as shown.

In step 404, the current frame output time range is updated. The current frame output time range is bounded by frame starting time Tc and Tc+Tf, where Tf is the duration of a video frame. As shown, Tc is set as T-D*, where T is the clock time of the media processor 306. Essentially, the setting of Tc instructs the mixer 327 to delay the video frame output by a delay D*. D* is periodically reset to the measured current commentary delay D, when the difference between D and D* exceeds a preset threshold. In this embodiment, D is set to the largest of the D(n) which does not exceed Dx.

More specifically, D(n)=Td(n)+Tj(n) where Td(n) is the measured current audio delay for audio commentator stream n and Tj(n) is the extra delay added to accommodate potential jitter from the voice uplink of commentator n. At each audio frame's ingestion, Td(n) is calculated as T-Tm (n)(smoothed). The remaining delays D(1) through D(n-1) are each determined in a similar manner, and as mentioned previously, the measured current commentary delay D is set to the largest of the D(n) which does not exceed Dx. As the overall system is asynchronous, the measured current commentary delay D is likely to drift over time, necessitating the reset of D*. The reset threshold, however, is configured to minimize frequent resets to minimize interruption of the operation of the media mixer module 328.

Using real-time uplink protocols, Tj(n) should be small and can be determined via link quality tests during system initialization. However, the present embodiment allows for Tj(n) to be derived from the Tm(n) data before smoothing and applied as a dynamic variable.

The mixer 327 then selects the appropriate input video and audio frames to mix from media buffer M and commentary buffers C(1) through C(n), respectively, also denoted as respective buffers 321 and 325-1, . . . 325-n in FIG. 3. This portion of the process is carried out using steps 406 through 422.

In step 406, the mixer 327 checks the timestamp Tm of the oldest video frame in media buffer M and proceeds as follows.

If Tm<Tc, the oldest video frame is deleted in step 408 and then step 406 is repeated. This part of the process therefore removes from media buffer M any video frames that are too old, i.e., video frames for which Tm<Tc.

If Tm>Tc+Tf, or media buffer M is empty, the process moves to step 410 to insert a loss concealment video frame as the oldest video frame, and then moves to step 412. This part of the process inserts loss concealment video frames if queued video frames are out of range or media buffer M is empty. Examples of loss concealment video frames include the latest complete video frame or an image still.

If Tc<Tm<Tc+Tf, the oldest video frame is in-range and the process moves directly from step 406 to step 412 as shown.

In step 412, any audio frames with Tm<Tc are deleted from commentary buffers C(1) though C(n).

At this point, a particular video frame has been identified for mixing, and it remains to identify in step 416, 418 and 420 appropriate corresponding audio frames from the respective commentary buffers C(1) through C(n) to be mixed with the particular video frame.

In step 416, for all n, the mixer 327 checks the timestamp Tm(n) of the oldest audio frame in each of the commentary buffers C(1) through C(n) and proceeds as follows.

If Tm(n)<Tc, the oldest audio frame is deleted in step 418 and then step 416 is repeated. This part of the process therefore removes from commentary buffer C(n) any audio frames that are too old, i.e., audio frames for which Tm(n)<Tc.

If Tm(n)>Tc+Tf, or commentary buffer C(n) is empty, the process moves to step 420 to insert a loss concealment audio frame, and then moves to step 422. This part of the process inserts loss concealment audio frames if queued audio frames are out of range or commentary buffer C(n) is empty. Examples of loss concealment audio frames include low-level white noise or repeated audio. Although not indicated in the figure, it is possible in other embodiments to use alternate audio in place of loss concealment audio frames when there are too many consecutive missing audio frames to effectively conceal.

If Tc<Tm(n)<Tc+Tf, the oldest audio frame of commentary buffer C(n) is in-range and the process moves directly from step 416 to step 422 as shown.

The above-described steps 416, 418 and 420 are performed for each of the different commentator buffers C(1) through C(n) to identify an appropriate corresponding audio frame for each of the n commentators.

In step 422, the particular identified video frame and the appropriate corresponding audio frames, which illustratively represent the oldest video frame from media buffer M and the oldest audio frames from respective commentary buffers C(1) through C(n), are sent to the media mixer module 328 to be mixed together to create an output commented video frame.

In step 424, a determination is made for all n as to whether or not the measured current commentary delay D(n) exceeds a maximum delay tolerance Dx. If D(n)>Dx, the media processor 306 signals the corresponding commentator station 310-n to restart its video player in order to allow the system to resynchronize, and otherwise does not so signal the commentator station 310-n. Also, any buffered audio frames for the commentator stream with measured current commentary delay D(n)>Dx are deleted from the corresponding commentary buffer C(n), thereby excluding those excessively delayed frames from possible selection for mixing with the video frames.

In step 426, the current iteration of the mixer algorithm 400 is exited. Another iteration will be triggered at the next timer interrupt, which restarts the process as described above for mixing of the next selected video and audio frames.

Again, it is to be appreciated that the particular process steps of the FIG. 4 flow diagram and other flow diagrams herein are presented by way of illustrative example only, and should not be construed as limiting in any way. The process steps can be varied in the manner described previously.

The illustrative embodiments described herein allow, for example, live streaming of an event with the inclusion of commentary, from one or more remote commentators who narrate or "call" the event, in a commented video stream that is delivered to end users. As indicated previously, these and other embodiments advantageously avoid the need to send commentators to the actual event or to rent a TV production studio and have the commentators travel to the studio, and can therefore be implemented at low cost relative to such conventional approaches. Moreover, a wide variety of different types of commentary can be received from remote commentators in a given embodiment and incorporated into a combined video stream for delivery to end users in accordance with the techniques disclosed herein. For example, remote commentators in some embodiments are enabled to provide audio content, video content, image content, social media posting content, chat text, closed caption text and/or other types of commentary for inclusion into a commented video stream. These and other embodiments can further allow certain remote commentators to control various aspects of the video production of the commented video stream that is delivered to end users.

The illustrative embodiments of FIGS. 1 to 4 implement adaptive buffering techniques that can accommodate relatively large delay and jitter in the connections between the commentator stations and the media processor. However, long link delays can negatively impact the ability of multiple commentators to interact effectively with one another, as such interaction in some embodiments can require that the delays between the commentators be below about 100 milliseconds. Nevertheless, commentators with long link delays can be accommodated if they are providing independent commentary. One such scenario would be to have a commentator posting voice, another posting text, and another doing sign language picture-in-picture (PIP) video over the main broadcast stream.

In embodiments that require effective interactions between commentators, the commentators can be configured to use low-latency RTMP or WebRTC links to a cloud-based media processor. With such links, the adaptive buffering techniques described above can be greatly simplified. For example, buffer length can be set once for a given session and need not be adjusted throughout the session. However, to reduce re-encoding overhead, which will add delay when commentators interact with one another, and to provide other significant advantages, alternative techniques utilizing other types of mixer arrangements can be deployed, as will be described in more detail below.

Some embodiments therefore need not utilize adaptive buffering techniques that attempt to minimize overall delay to the extent possible. These embodiments are instead particularly configured to provide quality interactivity between commentators, while tolerating a greater amount of overall delay.

Such arrangements provide stricter limits on the real-time nature of the commentator's links with respect to each other and the low quality version of the video stream. The overall delay to the greater viewer public, however, can be substantial. For example, if the live video source is in the U.S. while the target audiences are in China, the commentators could all be in China. The relatively low-quality version of the live video that is commented on by each of the commentators can be delayed, possibly by as much as a couple of seconds, before being viewed by the commentators. However, in some embodiments of this type, all of the commentators have low-latency RTMP or WebRTC links to cloud servers in China. As a result, the commentators have low latency relative to one another and can interact with one another and with the delayed low-quality video with ease. The high-quality version of the broadcast video could be delayed even further, in order to provide sufficient time for synchronization and mixing of all of the commentator input streams. Again, adaptive buffering techniques of the type described in conjunction with FIGS. 1-4 are not needed.

Additional illustrative embodiments involving remote commentary will now be described with reference to FIGS. 5, 6 and 7. These additional embodiments are respective examples of cloud-based commentator systems which provide advantages similar to those described above in the context of other embodiments. For example, the cloud-based commentator systems in these embodiments do not require a traditional TV studio or other equipment, and instead provide a solution that allows each of a set of commentators to be at "home" (e.g., on a consumer Internet connection, with a consumer-level desktop computer, laptop or other computing device). Moreover, the cloud-based commentator systems in these embodiments enable each commentator to provide a wide variety of commentary, including one or more of audio content, video content, image content, social media posting content, chat text and closed caption text, and further allow one or more of the commentators to control various aspects of the video production of an end result output video stream provided to end users.

The cloud-based commentary systems in these embodiments can be used in a wide variety of different remote commentator scenarios, as will become more apparent from the following description. For example, in some embodiments, commentators are enabled to add both audio and video to an end result output video stream of an event. The audio (e.g., the voice of the commentator) is mixed in with the audio of the event, and video of or provided by the commentator is mixed in with the video of the event, such as using various PIP video arrangements, overlays, etc. Other types of media content, such as images and/or chat text, can be used in addition to or in place of audio and video.

A given such cloud-based commentator system in some embodiments is illustratively configured to enable multiple commentators each in his or her own location. Such multiple commentator arrangements may be for a group commentator session for a single event that generates one output video stream, or can be for a single event commentated on by multiple commentators generating separate or multiple output video streams. The multiple commentators, in some cases, may be geographically dispersed. For example, commentators may be located in multiple continents or other geographic regions. Further, it is assumed that each of the commentators has at least a consumer-level personal desktop computer, laptop or other computing device with a standard Internet browser installed. The commentators are not required to have any specialized software installed on their computing devices, other than a commentator application of the type disclosed herein that is configured to support the remote commentator functionality. Such a commentator application can be implemented, for example, as a component of an otherwise conventional web browser. However, it is to be appreciated that web browsers are not required, and can be replaced in other embodiments by a wide variety of other types of application programs, such as native desktop applications or other computer applications that do not operate as or otherwise include web browsers.

In some embodiments, a live event is assumed to have multiple available input video streams associated therewith. The multiple input video streams may be obtained from respective ones of multiple camera streams generated at the event, although in other embodiments the multiple input video streams can comprise individual streams from multiple events, etc. One or more of the commentators is illustratively configured to control how the input video streams are combined into a final output video stream.

The cloud-based commentator system is also configured to provide or enable the use of graphic add-ons to the input video streams of the live event. Such graphic add-ons may include, but are not limited to, images, slates (e.g., a video slate used to facilitate video production), video clips, and social media postings (e.g., tweets from Twitter), each an example of "commentary information" as that term is broadly used herein. Each of the commentators is illustratively configured to control how such graphic add-ons or elements are added to the final output video stream. Alternatively, only a designated subset of the commentators may be authorized to perform such functions.

In some embodiments, there are multiple destinations for the final output video stream or streams. Such multiple destinations include, but are not limited to, traditional TV, social media platforms (e.g., Facebook, Twitter, YouTube, etc.), a variety of web sites and mobile applications, etc.

Figure 5:
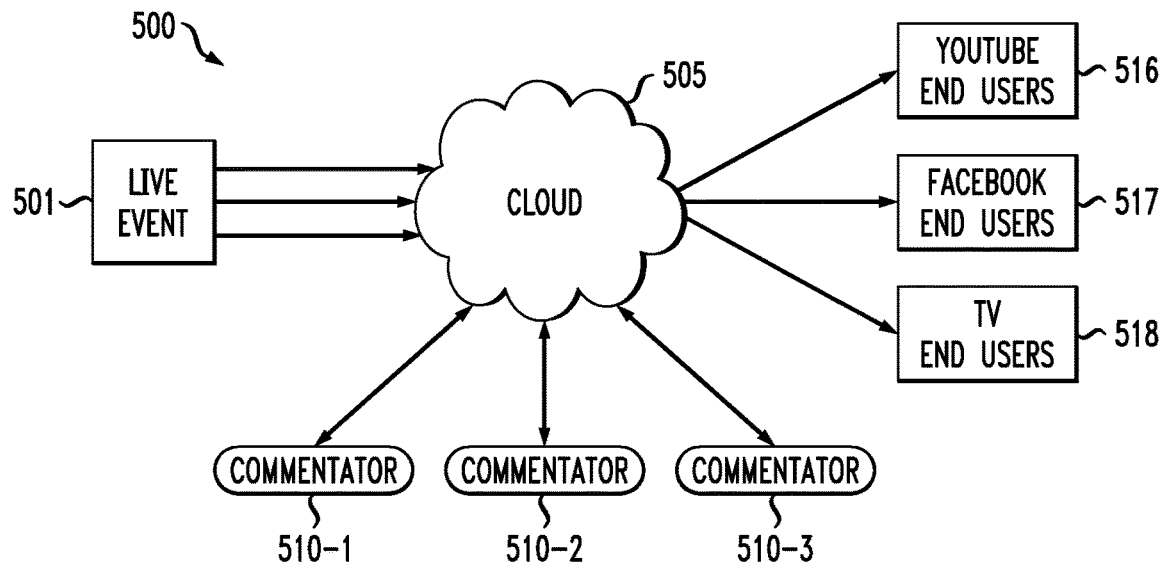
FIG. 5 is a block diagram of a cloud-based commentator system in an illustrative embodiment.

Referring now to FIG. 5, a cloud-based commentator system 500 is shown, illustrating the flow of streams between a live event 501, cloud 505, a set of commentators 510-1, 510-2 and 510-3, and multiple viewers illustratively comprising YouTube end users 516, Facebook end users 517, and TV end users 518. The cloud 505 illustratively implements one or more media processors each comprising components such as mixers and servers, as described in more detail elsewhere herein. The commentators 510 illustratively comprise respective commentator devices, such as computers or mobile devices, each corresponding to a different remote user and implementing a commentator application. The term "commentator" in the following description is generally used to refer to the commentator device, but may additionally or alternatively refer to its corresponding remote user.

Although FIG. 5 shows an example system in which there are three commentators, this is for purposes of illustration only. The number of commentators may vary as desired for a particular live event. Further, the number of streams of the live event may vary as desired (e.g., more or less than three as illustrated). Still further, the number and type of end users or other viewers of the live event may also vary.

The video of a commentator, in some embodiments, is added through a PIP layout. When there are several commentators, as in the case of commentators 510, one or more designated layouts are used to control the relative positioning between the original event video and the PIPs of each of the commentators. Note that these layouts may need to change dynamically during a game or other live event. For example, the layout of the original event video and the commentator PIPs in some embodiments changes dynamically as commentators 510 join or leave during the live event.

It is important in some embodiments to have what is referred to herein as "tight" synchronization between the event stream and each of the commentators, as will be described in more detail below. With such tight synchronization, the end users will perceive the event stream as well as the voice and PIP of each of the commentators as happening at the same time. More particularly, the event streams and the commentators 510 are tightly synchronized in some embodiments, by ensuring that there is no more than a specified maximum amount of delay, typically around 50-100 milliseconds, between them. Such an arrangement advantageously allows the commentators 510 to have a live interaction with each other and with the event stream, where each commentator is able to see and hear the event as well as the commentary from the other commentators.

Accordingly, in the cloud-based commentator system 500 of FIG. 5, it is assumed that the connections between the commentators 510 and components of the cloud 505 are bidirectional and tightly synchronized (e.g., with delays between 50-100 milliseconds).

In some embodiments, it is possible to allow delay between the original live event 501 and certain components of the cloud-based commentator system 500 as well as between the cloud-based commentator system 500 and the distribution platforms which supply the end users 516, 517 and 518. For example, it is typically acceptable for the end users 516, 517 and 518 to watch the event several seconds after the commentators 510 added their comments, as there is no tight synchronization needed between the end users 516, 517 and 518 and the commentators 510. Given that the commentators 510 in some cases are remote, it is also acceptable for the commentators 510 to add their comments a few seconds after the actual live event as long as their comments are tightly synchronized with the event stream and with each other.

The commentators 510 can add additional multimedia data to the event such as replays, images, tweets, statistics, etc. These are examples of what are more generally referred to herein as "commentary information." Other examples include audio, video, social media posts, and closed caption text.

In some embodiments, the commentators 510 can dynamically change the layout which specified how the input streams and the PIPs are mixed together in the cloud 505. These changes generally need to be synchronized but a delay of around one second is acceptable in some embodiments for a layout or content change. However, these changes are visible to all commentators at substantially the exact same time, in accordance with the tight synchronization requirement described above.

The production of the final output stream in cloud 505 to be sent to the end user platforms can also have an additional delay of a few seconds. This delay can be used to make sure that all media elements are synchronized even though they came through different paths. The delay can also be used to make sure that a corresponding video encoder achieves the best quality per bandwidth ratio for various bandwidths.

The end users 516, 517 and 518 typically watch the combined event (e.g., the final output stream) as a stream on a digital device (e.g., a laptop, tablet, or smartphone) or as a broadcast on a traditional TV set. These devices often have high definition and large resolution screens. Therefore, it is important to deliver the highest possible video quality to the end users. End users hence are less delay-sensitive, but more quality-sensitive.

Video encoders have a trade-off between delay, bandwidth, and quality. It is possible to get the best quality for a certain bandwidth at the cost of a higher delay. Alternatively, it is possible to get tight synchronization and small delays at the expense of bandwidth and quality. There are typically two types of systems used in the industry: live streaming systems and video conference systems. Live streaming systems have a higher delay (e.g., multiple seconds) with a good quality to bandwidth ratio. Video conference systems have lower delays (e.g., 50-100 milliseconds) with a lesser quality to bandwidth ratio.

The above example remote commentator scenario cannot be implemented using traditional streaming systems between the parties as the higher delays would make tight synchronization between the commentators and the event impossible. The above scenario can also not be accomplished with a traditional video conference system, as this would require much higher bandwidth than is typically available on a consumer Internet connection and much higher processing power than is typically available on consumer-level laptops or other computing devices. Hence, if one uses traditional video conference system technology with consumer Internet and personal computers, the resulting quality of the video would be very poor. Alternatively, one could get very high quality video with a traditional video conference system, but it would require dedicated bandwidth connections and high end compute servers. This would be prohibitively expensive and therefore not suitable for use in the scenario described above where the commentators are at home.

In some embodiments, the cloud-based commentator system 500 provides a hybrid system that uses both video conferencing and streaming technologies to meet the requirements outlined above. Further, the cloud-based commentator system 500 allows commentators 510 to add a wide variety of commentary to a live event. Commentators 510 are configured to add not only their voice, but also video to the event. The commentators 510 are also configured to affect the production and layout of the live event. For example, the commentators can switch input streams, add clips, tweets, images, slates and other commentary to further customize the output video stream provided to the end users.

The cloud-based commentator system 500, in some embodiments, utilizes one or more mixers and a media server. The media server is part of the cloud 505 and provides the central component responsible for routing video between each of the commentators 510 and the mixers. The mixers illustratively comprise a pre-mixer used to generate a relatively low resolution version of the event stream that is received by the commentators 510 via the media server, a plurality of instances of a commentary mixer associated with respective ones of the commentators 510, and a post-mixer configured to generate the final output video stream utilizing a relatively high resolution version of the event stream and the commentary information received from the commentators 510 via the media server. The post-mixer in some embodiments is configured to combine different multimedia elements such as video streams, images, and graphics into one output video stream following a prescribed layout. The pre-mixer and the post-mixer, like the media server, are assumed to be implemented in the cloud 505 of system 500, while the instances of the commentary mixer are implemented in respective ones of the commentator devices of the commentators 510.

Figure 6:
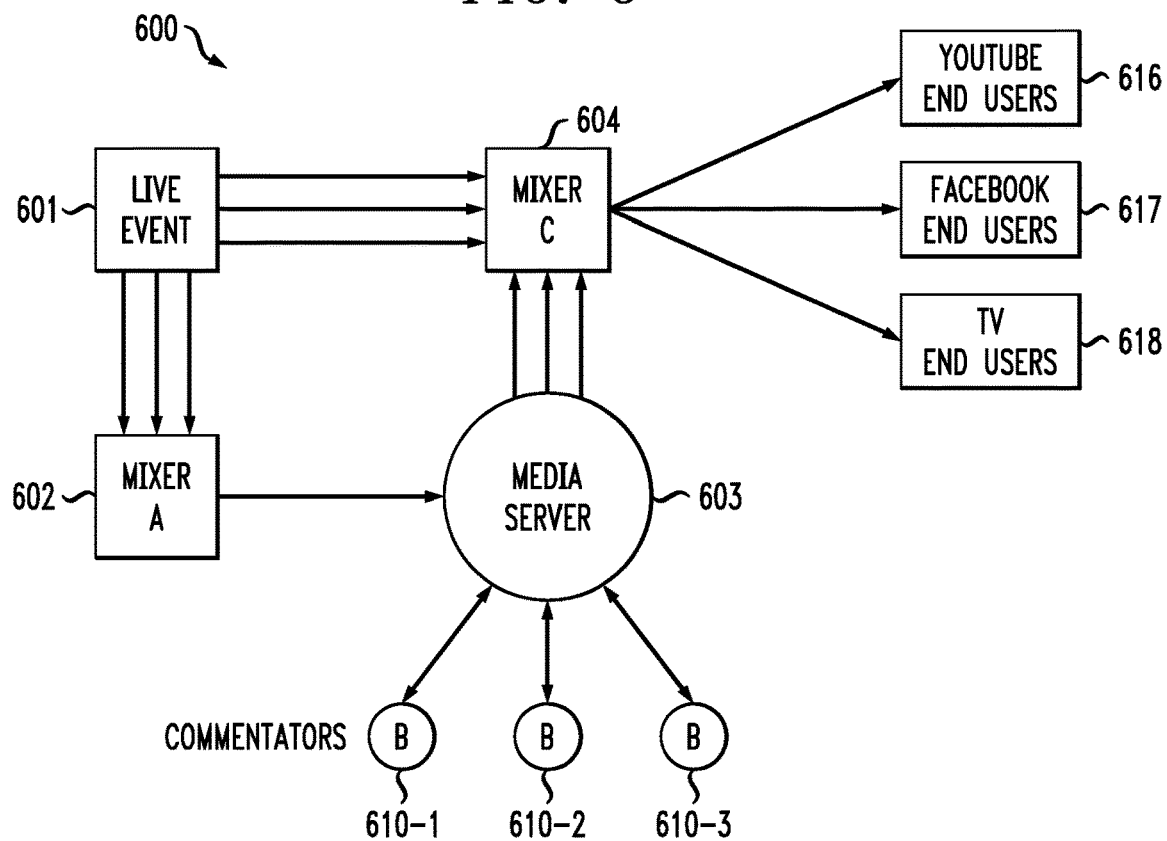
FIG. 6 is a block diagram showing a set of mixers and a media server in a cloud-based commentator system in an illustrative embodiment.
Figure 7:
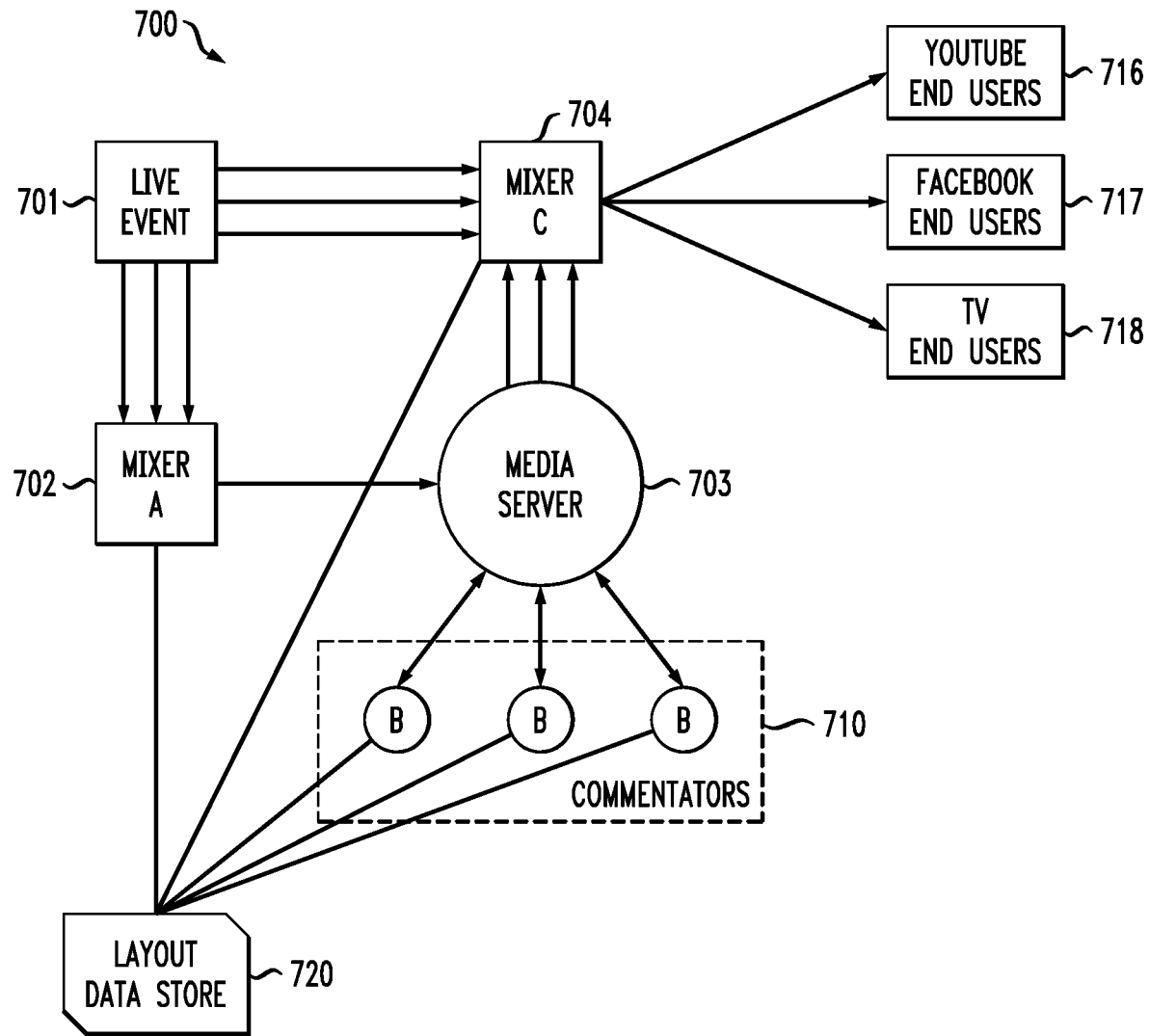
FIG. 7 is a block diagram showing synchronization of the set of mixers and the media server in the FIG. 6 cloud-based commentator system using a layout data store in an illustrative embodiment.

More detailed examples of the above-described mixer and media server components will now be presented in conjunction with the illustrative embodiments of FIGS. 6 and 7. It is to be appreciated that these are only examples, and other arrangements of mixers, media servers or other media processor components can be used.

FIG. 6 shows a cloud-based commentator system 600 that processes event streams from a live event 601 using a pre-mixer 602, a media server 603, a post-mixer 604 and a plurality of instances of a commentary mixer on respective ones of commentators 610-1, 610-2 and 610-3. The pre-mixer 602, media server 603 and post-mixer 604 are illustratively implemented in a cloud, similar to cloud 505 of system 500. A final output video stream generated by the post-mixer 604 is made accessible to end users 616, 617 and 618 associated with respective distinct distribution platforms, illustratively YouTube, Facebook and TV, as in the FIG. 5 embodiment, although other distribution platforms can be used.

In the FIG. 6 embodiment, three different types of mixers are used, namely, the pre-mixer 602, a commentary mixer comprising mixer instances on the respective commentators 610, and the post-mixer 604. These three different types of mixers are also denoted as respective Mixer A, Mixer B and Mixer C in the figure, with Mixer B comprising the multiple instances of commentary mixers on the respective commentators 610. Mixers A and C are illustratively implemented as cloud-based mixers in this embodiment, and Mixer B is illustratively implemented as multiple browser-based commentary mixer instances deployed in respective web browsers of the commentators 610.

It is to be appreciated that the term "web browser" as used herein is intended to be broadly construed, so as to encompass, for example, numerous types of software programs for use in interacting with web servers. A web browser can include a commentator application as a component of the web browser, or the web browser can be implemented as a component of a commentator application.

Numerous other arrangements are possible, such as ones in which the web browser and the commentator application are entirely separate from one another, but interact with one another in supporting the disclosed functionality.

Again, as indicated previously herein, web browsers are not required, and a wide variety of alternative application programs, not comprising or otherwise associated with web browsers, can be used.

Mixer A merges the various inputs from the live event 601 into one stream that is sent to the commentators 610 via the media server 603. Mixer A, in some embodiments, creates a lower-quality stream to be sent to the commentators 610 (e.g., over consumer Internet connections). Mixer A is illustratively configured to have no more than a designated maximum delay, which may be around one second.

Mixer B (with its respective instances denoted as "B" in the circles representing commentators 610 in FIG. 6) is a browser-based commentary mixer. Mixer B is configured to have a delay less than some designated threshold (e.g., a delay of a less than 50 milliseconds). As illustrated in FIG. 6, there is one instance of Mixer B per commentator. The various instances of Mixer B are assumed to run in a client web browser used by each of the commentators, and can have lower quality but with lower delay (e.g., relative to Mixer A). Through the media server 603, each of the commentators 610 receives a stream from the live event 601 as well as a stream from each other commentator. The local client of each commentator (e.g., a web browser) then decodes each stream and combines the video and audio for the commentator according to the layout. No re-encoding is needed, but the streams need to be tightly synchronized (e.g., within 50 milliseconds). In some embodiments, all commentator actions happen within the web browser and there is no need to install any specialized software on the commentator device, other than the commentator application that provides the Mixer B instance in support of the commentator functionality disclosed herein.

Mixer C merges the commentary streams received from the commentator 610 via the media server 603 with one or more event streams from the event 601 to provide a final output video stream for delivery to the end users 616, 617 and 618. Mixer C can have multiple seconds of delay. Mixer C creates one standard output stream for the end users to be delivered through CDN/Internet technology. There is only one instance of Mixer C, which can take several seconds to provide its associated mixing but may have a much higher quality to bandwidth ratio (e.g., relative to Mixer A and Mixer B). The total delay of Mixer C is a combination of the decoding time of each of the commentator streams, the delay to achieve close synchronization, the rendering of the combined video, images, and audio, and the re-encoding at high quality.

Close synchronization of the multiple commentator streams with the event stream is achieved in some embodiments utilizing techniques similar to those described above in conjunction with the illustrative embodiments of FIGS. 1 through 4, although other synchronization techniques can be used in other embodiments.

The interworking between the different types of mixers, and their varied sensitivity to delay, enables the cloud-based commentator system 600 described herein to provide the desired functionality. In some embodiments, Mixer A has a maximum one second delay that is acceptable for input stream switching, Mixer B has a low delay (e.g., 50 to 100 milliseconds) required for real time interaction of the commentators with the content and with one another, and Mixer C has a multiple second delay to get the best quality per bandwidth for the final output video stream. The use of these different mixer types in an architecture for a cloud-based commentator system advantageously facilitates the achievement of the desired features and functionality for multiple remote commentators.

For example, a mixer such as Mixer C could generally not be used for all mixing in the system 600, as the delay would not allow for live interactions between the commentators. It is also not effective to use a mixer such as Mixer B for all interactions, as it would require either much higher Internet speeds or much higher processing capabilities at the commentators, which would make the solution prohibitively expensive. Furthermore, a mixer such as Mixer B generally cannot be used by the end users as this would require special adaptation of the client for digital streaming and would simply be impossible for the regular TV end users. It is also not possible for a mixer such as Mixer B to perform all of the tasks of Mixer A, as a consumer level laptop or other similar computing device does not have enough processing power for such tasks. Also, the commentator's Internet connections might not be sufficient to bring all these streams to each commentator.

It should be noted that Mixer C should always get the original input streams at the highest quality from the event 601. Thus, while it is possible for Mixer A to downgrade the quality of the input streams to suit the Internet connections of the commentators, this will never affect the video quality of the input streams going to Mixer C. For example, a commentator on a low speed Internet connection could comment on the game while watching it in standard definition (SD), while the actual end users will see the event video with the synchronized comments in high definition (HD). Also, if a single commentator's Internet connection were to fail, it will only impact that commentator's voice and PIP. All other elements will be unaffected.

For the cloud-based commentator system 600 to function as desired, Mixers A, B and C need to remain synchronized. This means that Mixers A, B and C make the same changes in layout and media content at the same time. This makes it possible for the commentators to make production changes to the media content and layout structure, which are then properly propagated to all the other commentators and to the end users. Each commentator can affect the layout for themselves and all the other commentators, as well as the end users.

An example use case is where one of the commentators sees something interesting in one of the input streams, and wants to draw attention to it by switching to that stream and making it full screen. The layout of all the commentators and end users will follow. Production changes include, but are not limited to, adding or removing a new input stream, adding or removing a commentator, switching commentator PIPs on or off, changing how multiple input streams and multiple PIPs are laid out in a mixer, adding images or slates to either obscure the video or to serve as a background, adding video clips which can be played as part of the live stream, rendering tweets or other social media postings, etc.

The synchronization of Mixers A, B and C, in some embodiments, is achieved through the use of a predefined layout language and a shared data structure in the cloud-based commentator system, as will now be described in more detail.

FIG. 7 shows a cloud-based commentator system 700 that processes event streams from a live event 701, using a pre-mixer 702, a media server 703, a post-mixer 704 and a plurality of instances of a commentary mixer on respective ones of multiple commentators 710, to generate a final output video stream for end users 716, 717 and 718. These system components are generally configured to operate in a manner similar to that of the corresponding components of system 600 as previously described. However, in the system 700, each of the pre-mixer 702, the commentator mixer instances on commentators 710, and the post-mixer 704, interacts with a layout data store 720 as shown.

The layout data store 720 is illustratively configured to facilitate synchronization of Mixers A, B and C and the media server 703. The above-noted predefined layout language may be comprise Hypertext Markup Language (HTML), although other languages such as JavaScript can be used in other embodiments. Each layout prescribes which input, PIP streams, and media elements are combined and how they are laid out with respect to each other. The layouts may include, but are not limited to, one event input stream with one commentator PIP rendered on top, one input stream with four commentators rendered to the left of the input stream, four input streams rendered each in a quadrant of the screen (e.g., a "quad split" layout), etc. In some embodiments, commentators are enabled to predefine any desired number of layouts, and then dynamically switch between them during a live event.

The mixers in the cloud-based commentator system 700 utilize different parts of the layout definition for which they are responsible. Mixer A, in some embodiments, only uses the part of the layout definition that affects how the input streams and graphics are mixed together. Mixer B takes the output of Mixer A and adds the PIPs of the commentators in the browser of each commentator according to a PIP part of the layout definition. Mixer C will take all inputs from the event, the media, and the PIPs or other commentary and mixes them together using the full definition of the layout.

As indicated above, the layout data store 720 is used to facilitate this synchronization of Mixers A, B and C in system 700. The layout data store 720 is illustratively implemented in the form of a shared in-memory cloud-based data structure. For example, in some embodiments, the layout data store is implemented using cloud storage technology such as the Firebase system provided by Google.

In some embodiments, a synchronization algorithm proceeds as follows. Assume that one of the commentators 710 wants to make a change in the mix layout, or wants to add multimedia elements such as images, tweets, video clips or other commentary to the output stream. The commentator enters the desired layout changes in their client (e.g., such as through a graphical user interface (GUI)). A web client of the commentator sends the changes to the layout data store 720, and the layout data store 720 alerts the other commentator instances of Mixer B, as well as the cloud-based Mixers A and C, of the updates to the layout for the output stream. Each of the Mixers A, B and C then executes the updated layout at the prescribed time.

As indicated previously, it is possible in some embodiments for the commentators using a cloud-based commentator system to be geographically dispersed, such as on different continents, leading to increases in the propagation delays between the commentators. The typical protocol used by a media service (e.g., WebRTC) to communicate with all the commentators may not work well if the commentators are physically far apart (e.g., geographically dispersed on multiple continents). As a result, the synchronization may be lost or the video quality may degrade. Such issues are addressed in illustrative embodiments by extending the cloud-based commentator system with additional media servers. For example, media servers may be located in each continent where commentators are expected to be located. Each media server will connect with all the commentators in a particular region (e.g., on its associated continent) as well as with Mixers A and C. This can be done using a media server protocol such as WebRTC. The various media servers also communicate with each other, but using a different protocol that works better over long distances, such as Secure Reliable Transport (SRT).

When multiple media servers are used, a commentator will find the closest media server and send its stream there. The closest media server, in some embodiments, is determined algorithmically by empirically testing metrics such as Internet throughput, latency, routing architecture, etc.

It should be appreciated that multiple media servers may also be used to add redundancy and fail-over to a cloud-based commentator system.

In some embodiments, it is assumed that all commentators have equal permissions. In other words, each of the commentators is assumed to have full control over layout and production changes in the output video stream. When there are many commentators, or in cases where some commentators are less qualified to use the cloud-based commentator system, it is possible to have different permission models for different ones of the commentators. For example, some commentators would only be allowed to add their voice and PIP, but would not have any permission for layout or production changes. One commentator, or a few commentators, could then play the role of the overall production manager, communicating with each of the commentators and centralizing the production and layout changes.

The input streams from an event in some embodiments come with different delays. The different delays may result from various factors. For example, some cameras providing the input streams may be traditional TV cameras that go through a TV production chain at the event while other cameras (e.g., a GoPro camera mounted on an athlete's helmet) go through a pure digital transport model. In an e-sport setting, some input streams are from cameras pointed at the gamers, while other input streams are screen captures of each of the e-game consoles. In these and other scenarios, the input streams arriving in a production cloud such as cloud 505 may not be synchronized with one another. Thus, some embodiments add delays at the cloud ingestion point to make sure the input streams each get an individualized additional delay to fully synchronize them. This may be done manually, using synchronization markers that provide a marked event in all streams, suitable for use in a synchronization process. Examples of such synchronization markers include markers resulting from use of a movie "clapper," or markers resulting from inserting an image of a synchronized clock on all the input streams. It is also possible to implement algorithms to detect such synchronization markers and to automatically adjust the delays for the input streams.

In some of the above-described embodiments, the commentators interact with each other and with the low resolution live-event stream in a teleconferencing session via Mixer B. While a wide variety of other teleconferencing systems can be adapted to this purpose in the manner disclosed herein, the use of a browser-based system as described above is particularly cost-effective. Moreover, no transcoding is necessary. Each commentator's browser simply shows the other commentators' output streams in separate windows. In other words, the mixing is readily apparent on each commentator's screen. Moreover, as long as the delays from the commentators are within certain limits, each commentator will naturally compensate for the small delays from the other commentators. As indicated above, sufficient delay is added for the high resolution live-event stream to accommodate all the commentators' delays, including the additional delay to get to Mixer C.

It should once again be noted that a wide variety of different types of commentary can be provided, including by way of example audio, video, images, social media posts and closed caption text.

In some embodiments, each commentator can add live closed caption text into his or her commentator stream. For example, a human commentator adds (e.g., types) in live closed caption text while the event is happening. Such an arrangement can use the same synchronization techniques described elsewhere herein for commentator audio, but possibly with an added feature to "speed up" the typed comments a bit in order to adjust for the time it takes to type them, thereby improving the synchronization. It is also possible for the commentator to use a speech-to-text conversion system to automatically generate closed caption text from audio of commentator speech. Such a speech-to-text system can be integrated into the overall architecture of the system, possibly as a cloud-based component.

In other embodiments, one or more of the commentators can add video that includes sign language commentary. For example, a commentator could add a PIP showing that commentator translating the event commentary into visual sign language.

As yet another example, the commentators can interact via a "chat" arrangement that utilizes text rather than audio. Such text entered by the commentators using their respective commentator applications is intended to encompass various types of messaging text and is more generally referred to herein as "chat text."

Again, these are only examples of various types of commentary information that can be inserted into a final output video stream using the techniques disclosed herein. Such commentary information can include a wide variety of different media types, as well as combinations of multiple different media types.

As is apparent from the foregoing, illustrative embodiments disclosed herein are readily scalable to potentially large numbers of commentators, at least some of which are present at respective locations that are remote from a live video event venue.

Moreover, illustrative embodiments disclosed herein can be implemented at least in part using standard based built-in clients and HTTP servers, and thus at substantially reduced cost and complexity relative to conventional approaches.

Illustrative embodiments are not limited to use with the HLS protocol. For example, the disclosed embodiments can be adapted to save bandwidth with any HTTP based streaming protocol, including the MSS and MPEG DASH protocols. Moreover, it is to be appreciated that other embodiments can be configured utilizing a wide variety of other types of streaming protocols and accordingly are not limited to use with live streaming or HTTP.

Embodiments of the invention can be implemented using any type of mobile device or more generally any other type of client device, including, for example, desktop, laptop or tablet personal computers, smart televisions, smart watches, gaming systems and other processing devices.

It should once again be noted that the above-described arrangements are exemplary only, and alternative arrangements can be used in other embodiments.

The disclosed techniques can also provide significant advantages in numerous content delivery contexts other than live event video.

A given client, server or other component in a content delivery system as disclosed herein is configured utilizing a corresponding processing device comprising a processor coupled to a memory. The processor executes software code stored in the memory in order to control the performance of processing operations and other functionality. The processing device also comprises a network interface that supports communication over one or more networks.

The processor may comprise, for example, a microprocessor, an application-specific integrated circuit (ASIC), a field-programmable gate array (FPGA), a central processing unit (CPU), an arithmetic logic unit (ALU), a digital signal processor (DSP), a graphics processing unit (GPU) or other similar processing device component, as well as other types and arrangements of processing circuitry, in any combination.

The memory stores software code for execution by the processor in implementing portions of the functionality of the processing device. A given such memory that stores software code for execution by a corresponding processor is an example of what is more generally referred to herein as a computer-readable storage medium having computer program code embodied therein, and may comprise, for example, electronic memory such as SRAM, DRAM or other types of random access memory, read-only memory (ROM), flash memory, magnetic memory, optical memory, or other types of storage devices in any combination.

Articles of manufacture comprising such computer-readable storage media are considered embodiments of the invention. The term "article of manufacture" as used herein should be understood to exclude transitory, propagating signals.

In addition, embodiments of the invention may be implemented in the form of integrated circuits comprising processing circuitry configured to implement processing operations, such as mixing of live video and audio-only commentary from multiple remote commentators, associated with content delivery.

The particular configurations of content delivery systems described herein are exemplary only, and a given such system in other embodiments may include other elements in addition to or in place of those specifically shown, including one or more elements of a type commonly found in a conventional implementation of such a system.

For example, in some embodiments, a content delivery system may be configured to utilize the disclosed techniques to provide additional or alternative functionality in other contexts. The disclosed techniques can be similarly adapted for use in a wide variety of other types of content delivery systems.

It is also to be appreciated that the particular process steps used in the embodiments described above are exemplary only, and other embodiments can utilize different types and arrangements of processing operations.

It should again be emphasized that the embodiments of the invention as described herein are intended to be illustrative only. Other embodiments of the invention can be implemented utilizing a wide variety of different types and arrangements of content delivery systems, networks, and devices than those utilized in the particular embodiments described herein. In addition, the particular assumptions made herein in the context of describing certain embodiments need not apply in other embodiments. These and numerous other alternative embodiments will be readily apparent to those skilled in the art.

What is claimed is:

1. A method comprising:
receiving from each of a plurality of commentator applications corresponding commentary information relating to video content from at least one video source;
sending at least portions of the commentary information received from one or more of the commentator applications to one or more other ones of the commentator applications; and
generating commented video content based at least in part on the commentary information received from the commentator applications;
wherein receiving from each of the commentator applications corresponding commentary information relating to the video content comprises receiving a plurality of distinct streams of media content from respective ones of the commentator applications;
wherein the commented video content is provided to one or more servers of a content delivery network for delivery to one or more viewer devices; and
wherein the method is performed by at least one processing device comprising a processor coupled to a memory.

2. The method of claim 1 wherein the video content comprises live video from at least one live video source.

3. The method of claim 1 wherein the stream of media content received from a corresponding one of the commentator applications comprises at least one of audio content, video content, image content, social media posting content, chat text and closed caption text.

4. The method of claim 1 wherein the commentator applications receive respective instances of a designated version of the video content from said at least one video source.

5. The method of claim 4 wherein the designated version of the video content is generated in a pre-mixer of said at least one processing device at no more than a first resolution, utilizing a plurality of content streams from respective ones of a plurality of video sources, with each of the plurality of content streams having at least a second resolution where the second resolution is higher than the first resolution.

6. The method of claim 1 wherein the commentator applications are implemented on respective commentator devices that are separate from said at least one processing device that performs the method.

7. The method of claim 6 wherein the receiving and sending are implemented in a media server of said at least one processing device through interaction of the media server with respective web browsers of the respective commentator devices.

8. The method of claim 7 wherein each of the web browsers implements an instance of a commentary mixer configured to combine commentary information from its corresponding commentator application with additional commentary information received from respective other ones of the commentator applications via the media server.

9. The method of claim 8 wherein the instances of the commentary mixers implemented by respective ones of the web browsers are synchronized with one another relative to the video content to less than a specified amount of delay in order to support apparent real-time interaction between users of the commentator applications in the commented video content as viewed at the one or more viewer devices.

10. The method of claim 7 wherein a first web browser of a first one of the commentator devices is configured to present commentary information received from respective other web browsers of other ones of the commentator devices via the media server, wherein the commentary information received from the respective other web browsers via the media server is presented by the first web browser in respective distinct display windows.

11. The method of claim 6 wherein generating the commented video content comprises generating the commented video content by combining, in a post-mixer of said at least one processing device, at least portions of the commentary information received from the commentator applications with a designated version of the video content from said at least one video source.

12. The method of claim 1 wherein at least a first one of the commentator applications is configured to permit incorporation into the commentator information at least one of audio content, video content, image content, social media posting content, chat text and closed caption text, and to permit control of a manner in which such commentator information is to be utilized in generating the commented video content.

13. The method of claim 1 wherein generating the commented video content based at least in part on the commentary information received from the commentator applications comprises:
storing a plurality of distinct layouts each specifying a different arrangement of the commentator information in the commented video content; and
dynamically switching between at least a subset of the distinct layouts over time in generating the commented video content.

14. The method of claim 13 wherein a given one of the distinct layouts specifies for each of one or more of the commentator applications at least a positioning of corresponding commentator information in the commented video content.

15. The method of claim 13 wherein the distinct layouts are stored in a layout data store that is accessible to each of:
a pre-mixer used to generate a first resolution version of the video content received by the commentator applications;
a plurality of instances of a commentary mixer associated with respective ones of the commentator applications; and
a post-mixer configured to generate the commented video content utilizing a second resolution version of the video content and the commentary information received from the commentator applications;
wherein the second resolution version has a higher resolution than the first resolution version.

16. The method of claim 1 wherein the commentary information received from a given one of the commentator applications comprises additional multimedia information not part of the video content from the at least one video source.

17. The method of claim 16 wherein the additional multimedia information comprises at least one of an image, a video and a social media post.

18. The method of claim 16 wherein the additional multimedia information comprises at least one replay of at least a portion of the video content from the at least one video source.

19. An article of manufacture comprising a non-transitory computer-readable storage medium having computer program code embodied therein, wherein the computer program code when executed in at least one processing device causes said at least one processing device:
to receive from each of a plurality of commentator applications corresponding commentary information relating to video content from at least one video source;
to send at least portions of the commentary information received from one or more of the commentator applications to one or more other ones of the commentator applications; and
to generate commented video content based at least in part on the commentary information received from the commentator applications;
wherein receiving from each of the commentator applications corresponding commentary information relating to the video content comprises receiving a plurality of distinct streams of media content from respective ones of the commentator applications; and
wherein the commented video content is provided to one or more servers of a content delivery network for delivery to one or more viewer devices.

20. The article of manufacture of claim 19 wherein the receiving and sending are implemented in a media server through interaction of the media server with web browsers of respective commentator devices that implement the commentator applications.

21. The article of manufacture of claim 20 wherein each of the web browsers implements an instance of a commentary mixer configured to combine commentary information from its corresponding commentator application with additional commentary information received from respective other ones of the commentator applications via the media server.

22. An apparatus comprising:
at least one processing device comprising a processor coupled to a memory;
wherein said at least one processing device is configured:
to receive from each of a plurality of commentator applications corresponding commentary information relating to video content from at least one video source;
to send at least portions of the commentary information received from one or more of the commentator applications to one or more other ones of the commentator applications; and
to generate commented video content based at least in part on the commentary information received from the commentator applications;
wherein receiving from each of the commentator applications corresponding commentary information relating to the video content comprises receiving a plurality of distinct streams of media content from respective ones of the commentator applications; and
wherein the commented video content is provided to one or more servers of a content delivery network for delivery to one or more viewer devices.

23. The apparatus of claim 22 wherein the receiving and sending are implemented in a media server through interaction of the media server with web browsers of respective commentator devices that implement the commentator applications.

24. The apparatus of claim 23 wherein each of the web browsers implements an instance of a commentary mixer configured to combine commentary information from its corresponding commentator application with additional commentary information received from respective other ones of the commentator applications via the media server.

* * * * *